(12) United States Patent
Allison et al.

(10) Patent No.: US 8,530,528 B2
(45) Date of Patent: Sep. 10, 2013

(54) WATER-FORMING HYDROGENATION REACTIONS UTILIZING ENHANCED CATALYST SUPPORTS AND METHODS OF USE

(75) Inventors: Joe D. Allison, Bartlesville, OK (US); Byron G. Johnson, Bartlesville, OK (US)

(73) Assignee: Clariant Corporation, Louisville, KY (US)

( * ) Notice: Subject to any disclaimer, the term of this patent is extended or adjusted under 35 U.S.C. 154(b) by 340 days.

(21) Appl. No.: 13/016,745

(22) Filed: Jan. 28, 2011

(65) Prior Publication Data

US 2011/0230572 A1    Sep. 22, 2011

Related U.S. Application Data

(60) Provisional application No. 61/300,248, filed on Feb. 1, 2010.

(51) Int. Cl.
    *C07C 27/00*    (2006.01)

(52) U.S. Cl.
    USPC ........................................................ 518/700

(58) Field of Classification Search
    USPC ........................................................ 518/700
    See application file for complete search history.

(56) References Cited

U.S. PATENT DOCUMENTS

| | | | |
|---|---|---|---|
| 3,814,683 A | 6/1974 | Christman et al. | |
| 4,179,411 A | 12/1979 | Broersma et al. | |
| 5,439,859 A | 8/1995 | Durante et al. | |
| 6,897,180 B2 | 5/2005 | Mees et al. | |
| 7,012,104 B2 | 3/2006 | Espinoza et al. | |
| 7,226,548 B2 | 6/2007 | Xie et al. | |
| 7,241,716 B2 | 7/2007 | Janssen et al. | |
| 7,402,612 B2 | 7/2008 | Jin et al. | |
| 7,449,496 B2 | 11/2008 | Jin et al. | |
| 2004/0127352 A1 | 7/2004 | Jin et al. | |
| 2008/0039539 A1* | 2/2008 | Espinoza et al. | 518/716 |

OTHER PUBLICATIONS

Zhou, et al. "Structures and Transformation Mechanisms of the eta, gamma and theta Transition Aluminas," Acta Cryst. B-47:618 (1991).
Wefers, et al., "Oxides and hydroxides of aluminum" Alcoa Technical Paper No. 19 Revised, 1987.
Sinfelt, et al. "Catalytic Hydrogenolysis and Dehydrogenation over Copper-Nickel Alloys", J. Catal. (1972) 24, 283.
Dalmon, et al. "Hydrogenolysis of C2H6, C3H8 and n-C4H10 over Silica-Supported Nickel-Copper Catalysts" J. Catal. (1980), 66, 214-221.
Popova, et al., "Characterization of Nickel Loaded Mordenite Catalysts by Temperature Programmed Reduction," React. Kinet. Catal. Lett. (1989), 39, 27-32).
Nazimek, "Influence of Added Copper on the Activity of Ni/Al2O3 Catalysts in the Hydrogenolysis of n-Butane", React. Kinet. Catal. Lett. vol. 13, No. 4, 331-337 (1980).
Robertson, et al., "Determination of Reducibility and Identification of Alloying in Copper-Nickel-on-Silica Catalysts by Temperature-Programmed Reduction", J. Catal. (1975) 37, 424.

* cited by examiner

*Primary Examiner* — Jafar Parsa

(57) ABSTRACT

Improved reaction efficiencies are achieved by the incorporation of enhanced hydrothermally stable catalyst supports in various water-forming hydrogenation reactions or reactions having water-containing feeds. Examples of water-forming hydrogenation reactions that may incorporate the enhanced hydrothermally stable catalyst supports include alcohol synthesis reactions, dehydration reactions, hydrodeoxygenation reactions, methanation reactions, catalytic combustion reaction, hydrocondensation reactions, and sulfur dioxide hydrogenation reactions. Advantages of the methods disclosed herein include an improved resistance of the catalyst support to water poisoning and a consequent lower rate of catalyst attrition and deactivation due to hydrothermal instability. Accordingly, higher efficiencies and yields may be achieved by extension of the enhanced catalyst supports to one or more of the aforementioned reactions.

10 Claims, No Drawings

WATER-FORMING HYDROGENATION REACTIONS UTILIZING ENHANCED CATALYST SUPPORTS AND METHODS OF USE

CROSS-REFERENCE TO RELATED APPLICATIONS

This application is a non-provisional application which claims the benefit of and priority to U.S. Provisional Application Ser. No. 61/300,248 filed Feb. 1, 2010, entitled "Water-Forming Hydrogenation Reactions Utilizing Enhanced Catalyst Supports and Methods of Use," which is hereby incorporated by reference in its entirety.

FIELD OF THE INVENTION

The present invention relates methods for enhancing water-forming hydrogenation reactions that incorporate an enhanced hydrothermally stabilized catalyst support.

BACKGROUND OF THE INVENTION

A continuing challenge in chemical processes is increasing product yield and reducing costs associated with such processes. An example of one such process is the Fischer-Tropsch process, which is commonly facilitated by a catalyst.

In the Fischer-Tropsch process, a feed containing carbon monoxide and hydrogen is typically contacted with a catalyst in a reactor to form a range of hydrocarbons including gases, liquids and waxes. Catalysts desirably have the function of increasing the rate of a reaction without being consumed by the reaction. The catalyst is typically included within a catalyst support.

Fischer-Tropsch catalysts typically include a catalytic metal and are usually included in a catalyst support. The catalyst support is typically a porous material that provides mechanical strength and a high surface area, in which the active metal and promoter(s) can be deposited.

A catalyst support material is desirably stable. One example of a catalyst support is gamma alumina supports, which are desirable due to their lower reactivity than other comparable catalyst supports. Despite the tendency of gamma-alumina to be stable at atmospheric conditions, conventional Fischer-Tropsch catalyst supports such as gamma-alumina is known to exhibit a tendency to instability under hydrothermal conditions. For example, gamma-alumina undergoes an increase in average pore size and an accompanying decrease in surface area after hydrothermal treatment in the temperature range of about 150-300° C. In other words, gamma alumina supports are susceptible to water poisoning. Such a transformation would be undesirable in a catalyst. However, similar hydrothermal conditions occur, for example, in the Fischer-Tropsch process. In particular, in a Fischer-Tropsch process, water is produced during the Fischer-Tropsch reaction. The presence of water together with the elevated temperatures conventionally employed in the Fischer-Tropsch process create conditions in which hydrothermal stability, which is stability at elevated temperatures in the presence of water, is desirable. Thus, Fischer-Tropsch catalysts using gamma-alumina supports are known to exhibit a tendency to hydrothermal instability under Fischer-Tropsch operating conditions. This instability tends to cause a decrease in performance of gamma-alumina supported catalysts.

Finely divided supported catalysts used in fluidized or slurry systems have been known to attrite and deactivate, which causes longevity concerns and product separation issues due to fines formation. The attrition and the deactivation may be due in part to hydrothermal degradation by high pressure and temperature steam from water formed in the reactor. Particularly, the high pressure and temperature steam may promote rehydration of the catalyst support, such as in the case of an alumina support to boehmite and/or gibbsite phases causing a change in the chemical structure and leading to structural instability.

More recently, enhanced Fischer-Tropsch catalyst supports having improved hydrothermal stability have been developed such as those taught in U.S. Pat. No. 7,449,496, titled, "Stabilized Boehmite-Derived Catalyst Supports, Catalysts, Methods of Making and Using," filed Oct. 19, 2007, referred to therein as stabilized catalyst supports and stabilized aluminum oxide structures.

However, the use of these enhanced catalyst supports have not been successfully extended to other chemical processes outside of the Fischer-Tropsch process.

SUMMARY

The present invention relates methods for enhancing water-forming hydrogenation reactions that incorporate an enhanced hydrothermally stabilized catalyst support.

One example of a hydrogenation reaction process comprises the steps of: providing a hydrothermally stable alumina support; reacting a plurality of reactants under conversion promoting conditions in the presence of a catalyst supported by the hydrothermally stable alumina support to produce a plurality of products through a water-forming hydrogenation reaction; and allowing a plurality of products to be formed according to the water-forming hydrogenation reaction.

The step of reacting may comprise allowing the water-forming hydrogenation reaction to occur wherein the water-forming hydrogenation reaction is selected the group consisting of: an alcohol synthesis reaction; a dehydration reaction; a hydrodeoxygenation reaction; a methanation reaction; a catalytic combustion reaction; a hydrocondensation reaction; and a sulfur dioxide hydrogenation reaction.

The hydrothermally stable alumina support may be produced by a process comprising: (a) forming a mixture of a crystalline hydrous alumina precursor and a first structural stabilizer, wherein the crystalline hydrous alumina precursor comprises two or more crystalline boehmites having different average crystallite sizes differing by at least about 1 nm; (b) drying the mixture to form a dried material, wherein the step of drying comprises spray-drying; (c) impregnating the dried material with a second structural stabilizer to form a support precursor; and (d) heat treating said support precursor to form a stabilized support, wherein the step of heat treating comprises calcining at a temperature between about 450° C. and about 900° C. to convert the two or more crystalline boehmites to a hydrothermally stable alumina support.

One example of a reaction process comprises the steps of: providing a hydrothermally stable alumina support; reacting a plurality of reactants under conversion promoting conditions in the presence of a catalyst supported by the hydrothermally stable alumina support to produce a plurality of products in a reactor, wherein the step of reacting comprises introducing the water as feed to the reactor; and allowing a plurality of products to be formed according to the reaction.

The features and advantages of the present invention will be apparent to those skilled in the art. While numerous changes may be made by those skilled in the art, such changes are within the spirit of the invention.

DEFINITIONS AND NOMENCLATURES

For purposes of the present disclosure, certain terms are intended to have the following meanings.

"Catalytic material" refers to any metal that is present on a catalyst that is active for catalyzing a particular reaction. The catalytic material may include one or more catalytic metals. Promoters are also part of the catalytic material.

A "promoter" is one or more substances, such as a metal or a metal oxide or metal ion that enhances the activity of a catalytic metal in a particular process, such as employing synthesis of syngas or the Fischer-Tropsch synthesis (e.g., increase conversion of the reactant and/or selectivity for the desired product) or any other water-forming hydrogenation reaction. In some instances, a particular promoter may additionally provide another function, such as aiding in dispersion of active metal or aiding in reduction of the active metal.

A "structural stabilizer" is one or more compounds, such as a metalloid, a metal, oxides thereof, and ions thereof, that modifies at least one physical property of the support material onto which it is deposited, e.g., by impregnation, to render the support material more resistant to hydrothermal degradation in high temperature water partial pressure. It should be understood that stabilizers of alumina suitable for conferring different stabilities such as thermal stability, mechanical stability, improved crush strength, may not necessarily be effective as hydrothermal stabilizers. Without being limited by theory, the mode of destabilization of alumina by hydrothermal action may be caused by the rehydration of the aluminum oxide matrix to a hydrated form, such as boehmite or pseudo-boehmite or bayerite or gibbsite. If for example, an added element to the alumina matrix provides an improved crush strength by conferring a greater rigidity to the crystalline structure, it may not necessarily protect in a suitable manner the alumina against a chemical attack by water. Hence, an effective "structural stabilizer" in the present invention would prevent or minimize changes in the porosity of the stabilized support (e.g., change in average pore size or surface area) when the stabilized support is exposed to high water partial pressure.

With respect to a catalytic reaction such as partial oxidation of light hydrocarbons such as methane or natural gas to produce synthesis gas or conversion of synthesis gas to hydrocarbons, references to "catalyst stability" refer to maintenance of at least one of the following criteria: level of conversion of the reactants, productivity, selectivity for the desired products, physical and chemical stability of the catalyst, lifetime of the catalyst on stream, and resistance of the catalyst to deactivation.

A precursor or a compound or a precursor compound of an element (e.g., metal) is a chemical entity, such as, for example, a water-soluble metal salt, in which each molecule contains one or more atoms of said element (e.g., a catalytic metal, a promoter, or a structural stabilizer) in which the element may be in a zero oxidation state or may have an oxidation state. This applies to any element selected from the group consisting of a catalytic metal, a promoter, and a structural stabilizer.

As used herein, the term "alcohol synthesis reaction" refers to any reaction of the form, $CO_2+3H_2 \rightarrow CH_3OH+H_2O$.

As used herein, the term "dehydration reaction" refers to any reaction of the form, $ROH+R'OH \rightarrow ROR'+H_2O$, where R or R' is any normal or branched aliphatic or aromatic hydrocarbon chain.

As used herein, the term "hydrodeoxygenation reaction" refers to any reaction of the form, $ROH+H_2 \rightarrow RH+H_2O$.

As used herein, the term "methanation reaction" refers to any reaction of the form, $CO+3H_2 \rightarrow CH_4+H_2O$.

As used herein, the term "catalytic combustion reaction" refers to any reaction of the form, $CH_4+2O_2 \rightarrow CO_2+H_2O$.

As used herein, the term "hydrocondensation reaction" refers to any methanol to gasoline reactions of the form, $2CH_3OH \rightarrow CH_3OCH_3+H_2O$, followed by $CH_3OCH_3 \rightarrow$ mixed hydrocarbons.

As used herein, the term "sulfur dioxide hydrogenation reaction" refers to any Claus tail gas reaction of the form, $SO_2+3H_2 \rightarrow H_2S+2H_2O$.

In the relatively new field of bio-chemicals and bio-fuels, biomass materials not only undergo hydrodeoxygenation reactions or dehydration reactions for the production of chemicals and fuels but are also fed as a water solution into reactors. The solvent water in these cases (or other cases when water is fed to a reactor) will also act as a support destabilizer due to the aforementioned conversion of alumina to the hydrated phase (e.g. boehmite, etc).

DETAILED DESCRIPTION

The present invention relates methods for enhancing water-forming hydrogenation reactions that incorporate an enhanced hydrothermally stabilized catalyst support.

Methods and systems are provided for enhancing certain types of water-forming hydrogenation reactions by one or more hydrothermally stable alumina supports. Examples of hydrothermally stable alumina supports suitable for use with methods of the present invention are disclosed in U.S. Pat. No. 7,449,496, titled, "Stabilized Boehmite-Derived Catalyst Supports, Catalysts, Methods of Making and Using," filed Oct. 19, 2007, referred to therein as stabilized catalyst supports and stabilized aluminum oxide structures, which is hereby incorporated by reference.

A reaction appropriate catalyst is then selected based on the desired reaction to be carried out and the catalyst is supported in the hydrothermally stable alumina support. Any one of the enhanced hydrothermally stable catalyst supports disclosed in U.S. Pat. No. 7,449,496 may be provided for use with the embodiments disclosed herein. A plurality of reactants is then introduced to a reactor under conversion promoting conditions in the presence of the catalyst supported by the hydrothermally stable alumina support to produce a plurality of desired products.

The desired reaction may be any water-forming hydrogenation reaction or any reaction having water in the reactor feed. Examples of water-forming hydrogenation reactions suitable for use with certain embodiments of the present invention include, but are not limited to, alcohol synthesis reactions, dehydration reactions, hydrodeoxygenation reactions, methanation reactions, catalytic combustion reaction, hydrocondensation reactions, and sulfur dioxide hydrogenation reactions. Advantages of the methods disclosed herein include an improved resistance of the catalyst support to water poisoning and a consequent lower rate of catalyst attrition and deactivation due to hydrothermal instability. It is also recognized that this process may be also extended to any reaction where the feed contains water. Accordingly, higher efficiencies and yields may be achieved by extension of the enhanced catalyst supports to the aforementioned reactions. Additional advantages include the relative ease with which the enhanced hydrothermally stable catalyst supports may be incorporated into such water-forming hydrogenation reactions with little or no change to operating conditions or existing process equipment.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In certain embodiments, enhanced hydrogenation reaction processes comprise the steps of: providing a hydrothermally stable alumina support; reacting a plurality of reactants under conversion promoting conditions in the presence of a catalyst supported by the hydrothermally stable alumina support to produce a plurality of products through a water-forming hydrogenation reaction; and allowing a plurality of products to be formed according to the water-forming hydrogenation reaction. The water-forming hydrogenation reaction may be selected from the group consisting of: an alcohol synthesis reaction, a dehydration reaction, a hydrodeoxygenation reaction, a methanation reaction, a catalytic combustion reaction, a hydrocondensation reaction, and a sulfur dioxide hydrogenation reaction.

In some embodiments, the hydrothermally stable alumina support produced by a process comprising: (a) forming a mixture of a crystalline hydrous alumina precursor and a first structural stabilizer, wherein the crystalline hydrous alumina precursor comprises two or more crystalline boehmites having different average crystallite sizes differing by at least about 1 nm; (b) drying the mixture to form a dried material, wherein the step of drying comprises spray-drying; (c) impregnating the dried material with a second structural stabilizer to form a support precursor; and (d) heat treating said support precursor to form a stabilized support, wherein the step of heat treating comprises calcining at a temperature between about 450° C. and about 900° C. to convert the two or more crystalline boehmites to a hydrothermally stable alumina support.

In this way, various hydrogenation reactions may be enhanced through decreased catalyst support attrition and deactivation.

Catalyst Support

According to a preferred embodiment of the present invention, an effective catalyst includes a stabilized support that includes a structural stabilizer. The structural stabilizer may be any material that when added to the support or a support precursor is capable of increasing the robustness of the catalyst under reaction conditions. The robustness may be exhibited, for example, as mechanical strength, attrition resistance, hydrothermal stability, and the like.

The stabilized support may have between about 0.5 weight percent and about 20 weight percent (wt %) of the structural stabilizer in the total support weight, preferably between about 1 wt % and about 10 wt % of the structural stabilizer in the total support weight, and more preferably between about 1 wt % and about 8 wt % of the structural stabilizer in the total support weight. In some embodiments, the stabilized support comprises between about 0.5 weight percent and about 5 weight percent (wt %) structural stabilizer based on the total support weight.

The stabilized support is preferably porous. The stabilized support may have an average pore size larger than about 4 nm, preferably between about 4 nm and about 50 nm, more preferably between about 4 nm and about 20 nm, still more preferably between about 9 nm and about 20 nm. In alternate embodiments, the average pore size is larger than about 6 nm, preferably between about 6 nm and about 50 nm, more preferably between about 6 nm and about 20 nm. In some embodiments, the stabilized support comprises a bimodal distribution of pore sizes with the two modes differing by at least about 1 nm, preferably by at least about 3 nm. One mode is preferably between about 4 nm and about 20 nm, more preferably between about 6 nm and about 20 nm, while the other mode is preferably between about 15 nm and about 50 nm, more preferably between about 20 nm and about 40 nm.

In preferred embodiments, the average surface area of the stabilized support, including the surface of the pores, is larger than about 30 square meters per gram of support ($m^2$/g support), preferably larger than about 5 $m^2$/g support, more preferably between about 50 $m^2$/g support and about 250 $m^2$/g support, still more preferably between about 70 $m^2$/g support and about 200 $m^2$/g support. In some embodiments, the average surface area of the stabilized support is between about 60 $m^2$/g support and about 240 $m^2$/g support.

In alternate embodiments, the average surface area of the stabilized support, including the surface of the pores, is less than about 50 square meters per gram of support ($m^2$/g support), preferably between about 0.5 $m^2$/g support and about 50 $m^2$/g support, more preferably between about 1 $m^2$/g support and about 30 $m^2$/g support.

In some embodiments, a support stabilized with cobalt (or a cobalt-containing compound, such as cobalt oxide and/or cobalt aluminate), or stabilized with magnesium (or a magnesium-containing compound such as magnesium oxide and/or spinel) or stabilized with aluminum (or an aluminum-containing compound) or stabilized with cobalt and boron (or compounds thereof such as cobalt oxide, cobalt aluminate, boria, boron aluminate, or combinations thereof) comprises an average pore size between about 6 nm and about 20 nm; a BET surface area between about 75 $m^2$/g support and about 200 $m^2$/g support; and a pore volume between about 0.25 cc/g support and about 0.55 cc/g support.

In some embodiments, a support stabilized with silicon or a silicon-containing compound comprises an average pore size between about 10 nm and about 20 nm; a BET surface area between about 90 $m^2$/g support and about 180 $m^2$/g support; and a pore volume between about 0.4 cc/g support and about 0.55 cc/g support, preferably between about 0.4 cc/g support and about 0.5 cc/g support.

When the stabilized support is in the form of particles, the particles have a size between about 10 microns and about 250 microns, preferably between about 10 microns and about 200 microns, more preferably between about 20 microns and about 200 microns, most preferably between about 20 microns and about 150 microns, when the catalyst is intended for use in a slurry bed reactor or fluidized bed reactor. The average size of the stabilized support particles may be between about 30 microns and about 150 microns; preferably between about 40 microns and about 120 microns; more preferably between about 50 microns and about 100 microns; most preferably between about 60 microns and about 90 microns. In alternative embodiments, the average size of the stabilized support particles is greater than about 30 microns. Alternatively, when the catalyst is intended for use in a fixed or packed bed reactor, particles of the stabilized support may have an average particle size greater than about 0.5 mm, preferably greater than about 1 mm. In other embodiments, when the catalyst is intended for use in a fixed or packed bed reactor, particles of the stabilized support can have a maximum size of about 10 mm or less, preferably about 6 mm or less, more preferably about 3 mm or less. Each particle of the stabilized support may include a plurality of crystallites. The crystallites in the stabilized support preferably have an average crystallite size between about 10 nm and about 40 nm.

In some embodiments, the stabilized catalyst support prepared according to the present invention preferably comprises a transition alumina. The transition alumina matrix may include an alumina phase selected from the group consisting of gamma-alumina; eta-alumina; delta alumina; theta-alumina, and any combinations of two or more thereof. In preferred embodiments, the stabilized catalyst support preferably comprises a gamma alumina XRD pattern, but is different from a conventional gamma alumina in a way that the primary particles of the stabilized alumina support inherit the unique morphology and crystallite size of the boehmite material from which it is derived. Additionally, the stabilized catalyst support preferably contains a gamma alumina phase or a gamma-like alumina phase, but does not contain another transitional alumina phase selected from the group consisting of delta alumina and theta alumina. Alternately or additionally, the stabilized catalyst support prepared according to the present invention may comprise a transitional alumina phase other than gamma-alumina, such as delta-alumina and/or theta-alumina. In some embodiments, the stabilized catalyst support may comprise a theta-alumina matrix which includes at least a portion of the structural stabilizer or oxide thereof. In some embodiments, the stabilized aluminum oxide structure consists of a transition alumina matrix (e.g., gamma-alumina or a gamma-alumina like matrix; theta-alumina or a theta-alumina like matrix; and the like) that includes the structural stabilizer within the aluminum oxide structure, e.g, silicon-substituted gamma-alumina. Alternatively, the stabilized aluminum oxide structure may consist of a dispersed phase of an oxide form of the structural stabilizer or an aluminate form of the structural stabilizer or both (e.g., silica, magnesia, zirconia, zirconia, lanthana, cobalt aluminate, magnesium aluminate, lanthanum aluminate, and the like) in a transition alumina matrix.

In some embodiments, the stabilized catalyst support prepared according to the present invention may comprise an alpha alumina phase or an alpha-like alumina phase. In an embodiment, such a stabilized catalyst support may comprise an alpha alumina phase or an alpha-like alumina phase when the method of preparation employs a heat treatment at a temperature greater than about 900° C., preferably greater than about 1000° C., more preferably greater than about 1100° C., but not exceeding about 1600° C. Alternatively, the stabilized aluminum oxide structure may consist of a dispersed phase of an oxide form of the structural stabilizer or an aluminate form of the structural stabilizer or both (e.g., silica, magnesia, zirconia, cobalt aluminate, magnesium aluminate, zirconia, and the like) in an alpha-alumina matrix.

In alternate embodiments, the stabilized catalyst support prepared according to the present invention preferably comprises particles, wherein each particle contains an alumina phase and an aluminate, said aluminate comprising at least a portion of the structural stabilizer. An "aluminate" herein refers to a compound of alumina and a structural stabilizer oxide, e.g., a solid solution or a homogeneous solid of the structural stabilizer or an oxide thereof and aluminum oxide. Non-limiting examples of aluminates are cobalt aluminate, lanthanum aluminate, magnesium aluminate, aluminate silicate, and the like. The aluminate may be in the form of a spinel, such as $CoAl_2O_4$ spinel or $MgAl_2O_4$ spinel.

The stabilized support is preferably non-dispersible in water or an aqueous solution, wherein said aqueous solution can comprise an active metal compound. In some embodiments, the stabilized support may also be non-dispersible in acidic solution.

Accordingly, the stabilized support of the present invention may be shaped or formed in the form of powders, particles, particulates, pellets, granules, beads, pills, cylinders, trilobes, extrudates, spheres or other rounded shapes, or other manufactured configurations.

In some compositions, the stabilized support comprises an aluminum oxide and a structural stabilizer comprising a metal or a metalloid, the metal or metalloid of which is in a different row of the Periodic Table than aluminum. In other compositions, the stabilized support comprises an aluminum oxide and a structural stabilizer comprising a metal or a metalloid, the metal or metalloid of which is in the same row of the Periodic Table than aluminum, such as magnesium or silicon.

The stabilized support may be made by a plurality of methods, which include treating a material comprising one crystalline hydrous alumina precursor or a plurality thereof in contact with a structural stabilizer or a precursor compound thereof.

Crystalline Hydrous Alumina Precursor

The crystalline hydrous alumina precursor may comprise at least one crystalline aluminum hydroxide. Crystalline aluminum hydroxides are precursors of metastable transition aluminas. Examples of crystalline aluminum hydroxides include gibbsite, bayerite, nordstrandite, diaspore, boehmite, and tohdite. The crystalline forms of aluminum trihydroxide are gibbsite ($Al(OH)_3$), bayerite (a polymorph of gibbsite), and nordstrandidte, whereas the crystalline forms of aluminum oxide hydroxide are boehmite (AlOOH) and diaspore. In preferred embodiments, the crystalline hydrous alumina precursor comprises at least one crystalline boehmite; or at least one crystalline bayerite; or a plurality thereof; or combinations thereof.

The crystalline hydrous alumina precursor preferably comprises a solid form and does not consist of a dissolved form, such as an aluminum salt or an aluminate salt. However, it is envisioned that the crystalline hydrous alumina precursor may comprise both solid and dissolved alumina precursor compounds, such as in a non-limiting example, the crystalline hydrous alumina precursor may comprise a mixture of solid particles of a crystalline aluminum hydroxide and dissolved alumina precursor compound (e.g., aluminate salt or dissolved aluminum salt or both) in a solvent.

The crystalline hydrous alumina precursor preferably comprises an average crystallite size selected from an optimum range. The higher the average crystallite size of crystalline hydrous alumina precursor, the better the hydrothermal resistance of the support, but the lower the surface area of the support. There is a trade-off between desirability of hydrothermal resistance and requirement for a specific surface area needed for supporting catalytic metal(s) of the resulting stabilized supported catalyst. This trade-off may dictate an optimum range of average crystallite sizes from which an average crystallite size is selected so as to achieve a hydrothermal resistance and a surface area suitable for the end-use catalyst. The optimum range of average crystallite size may comprise a low limit determined by a desired minimum level of hydrothermal resistance of the resulting support (e.g., less than 10% change in the average pore size in a steaming test) and an upper limit determined by a desired minimum surface area or maximum average pore size (e.g., an average pore size of not more than about 20 nm; or a BET surface area of the support of at least about 50 $m^2/g$). The low limit optimum of the optimum range of average crystallite size may be determined by both a desired minimum level of hydrothermal resistance of the resulting support and a minimum average pore size (e.g., an average pore size greater than about 6 nm; or a BET surface area of the support of less than about 200 m²/g).

In some embodiments, the crystalline hydrous alumina precursor may comprise one crystalline bayerite or a plurality of crystalline bayerites. The crystalline bayerite may have an average crystallite size ranging from about 30 nm to about 50 nm; or alternatively from about 35 nm to about 45 nm. When the crystalline hydrous alumina precursor comprises more than one crystalline bayerite, the plurality of crystalline bayerites preferably have an average crystallite size that differ by at least about 1 nanometer (nm), preferably by at least about 3 nanometer (nm); more preferably by at least about 5 nanometer (nm).

The crystalline hydrous alumina precursor can be obtained as commercial bayerite. Commercial bayerite may be available as a powder primarily having micron-sizes, e.g., with particle sizes ranging between about 0.1 micron and about 50 microns. A commercial bayerite may have an average particle size of less than about 40 microns, such as between about 20 microns and about 40 microns or between about 15 microns and about 30 microns. Without being limited, for powders obtained with an average particle size outside a desired range, the average particle size may be adjusted by spray-drying (e.g., shaping) a dispersion or suspension of the bayerite powder in a solvent (such as a bayerite sol or a bayerite slurry) so as to obtain a bayerite material with a desired average particle size and/or particle size distribution, for example as disclosed herein. It is to be understood that the desired average particle size and/or particle size distribution is generally dictated by the end use of the catalyst made from the stabilized support.

The crystalline hydrous alumina precursor may comprise one crystalline boehmite or a plurality of crystalline boehmites. The boehmite in the crystalline hydrous alumina precursor is preferably derived as synthetic boehmite. Synthetic boehmite includes any boehmite not derived from ore. When the boehmite is synthetic boehmite, the synthetic boehmite can be made by any suitable process. For example, synthetic boehmite can be made by a gellation method such as a modified Ziegler alcohol process that produces high purity gels derived from aluminum metal or a process comprising dissolving and precipitating aluminum trihydrate that produces high porosity gels albeit with more impurities. For instance, maturation of an Al(OH)$_3$ gel at pH>12 and 80° C. produces synthetic boehmite. The maturation time of the Al(OH)$_3$ gel affects the average crystallite size of the resulting synthetic boehmite, as typically the longer the maturation, the larger the average crystallite size of the resulting synthetic boehmite. High purity boehmite gels may contain very low levels (i.e., less than 0.01 wt %) of impurities typically present in alumina, such as iron, silicon, and sodium. High purity boehmite gels have a structure that consists of small boehmite crystals, often referred to as pseudoboehmite, which is in the form of aluminum monohydrate, AlO(OH)—H$_2$O.

In alternative embodiments, the boehmite in the crystalline hydrous alumina precursor can be derived as natural boehmite. In one alternative embodiment, any conventional natural boehmite may be suitable as the boehmite. Minor variations, such as in impurities, may exist between various commercial sources of natural boehmite. Exemplary impurities include, for example, elements or compounds derived from other materials contained in natural sources of boehmite. Thus, natural boehmite may include minor amounts of any one or combination of iron, titanium, and silicon.

According to some embodiments, the crystalline hydrous alumina precursor can be a mixture of a synthetic boehmite and a natural boehmite. According to other embodiments, the crystalline hydrous alumina precursor can be a mixture of two or more synthetic boehmites differing in average crystalline sizes by at least about 1 nm.

The crystalline hydrous alumina precursor may comprise one crystalline boehmite or a plurality of crystalline boehmites. When the crystalline hydrous alumina precursor comprises more than one crystalline boehmite, the plurality of crystalline boehmites preferably have an average crystallite size that differ by at least about 1 nanometer (nm).

The average crystallite size of crystalline boehmite or bayerite may be determined by X-ray diffraction (XRD) patterns of the boehmite material. XRD sizing of crystallites may be performed using the Scherrer equation (see for example H. P. Klug and L. E. Alexander, *X-Ray Diffraction Procedures for Polycrystalline and Amorphous Materials*, John Wiley, New York, 2nd Edition, 1974).

In an embodiment, the crystalline hydrous alumina precursor may comprise a pseudoboehmite, a boehmite, or combinations thereof. A pseudoboehmite refers to a small crystal sized boehmite that may contain intercalated water. In an embodiment, pseudoboehmite may occur as nano-crystalline plates or needles with each plate or needle being a few nanometers in size (e.g., with an average crystallite size not larger than 5 nm), and boehmite comprises rod-like and/or platelet-like crystallites with a larger size (e.g., with an average crystallite size of 5 nm or more).

According to some embodiments, the crystalline hydrous alumina precursor can be spray-dried boehmite. Alternatively, the crystalline hydrous alumina precursor can be extruded boehmite.

The crystalline hydrous alumina precursor can be obtained as commercial boehmite. Commercial boehmite may be available as a powder primarily having micron-sizes, e.g., with particle sizes ranging between about 1 and about 50 microns. A commercial boehmite may have an average particle size of less than about 40 microns, such as between about 20 microns and about 40 microns or between about 15 microns and about 30 microns. Without being limited, for powders obtained with an average particle size outside a desired range, the average particle size may be adjusted by spray-drying (shaping) a dispersion or suspension of the boehmite powder in a solvent (such as a boehmite sol or a boehmite slurry) so as to obtain a boehmite material with a desired average particle size and/or particle size distribution, for example as disclosed herein. It is to be understood that the desired average particle size and/or particle size distribution may be dictated by the end use of the catalyst made from the stabilized support. In some embodiments, the boehmite sol or a boehmite slurry may further contain an acid (such as nitric acid, acetic acid, and the like) so as to form a colloidal suspension of the boehmite material before re-shaping. In alternate embodiments, the boehmite sol or slurry does not contain an acid before re-shaping.

The crystalline hydrous alumina precursor may be available in a variety of rheological and physical forms. For instance, the crystalline hydrous alumina precursor may be in the form of a powder, a gel, a sol, a slurry, or a paste. A boehmite "sol" refers to a two-phase colloidal system where the continuous phase is liquid and the dispersed phase (i.e., boehmite) is solid. A boehmite "sol" may comprise nano-sized particles of boehmite, such as varying between about 10 and about 1000 nm. If the solid particles aggregate or polymerize to form a giant aggregate that extends through the sol, the boehmite material is said to be a "gel." A boehmite "sol"

may be transformed into a "gel" and sometimes vice versa. One property of the boehmite powders is that a particle size reduction can be obtained by chemical attack such as in the presence of a dilute monovalent acid. For example, to form a "sol," boehmite particles in a powder break down due to chemical attack by the acid into smaller fragments, which additionally are provided with a positive charge. The positively-charged fragments in the "sol" may not settle in the continuous phase due to electrostatic repulsion. A boehmite "slurry" refers to a boehmite powder dispersed in a solvent. In an embodiment, a boehmite "slurry" comprises a boehmite powder with larger particle sizes than that of a colloidal state of boehmite in a "sol." A boehmite "slurry" typically comprises micron-sized particles of boehmite. A boehmite "sol" or "slurry" may comprise less than about 50% by weight of solids, preferably between about 20 wt % and about 45 wt % solids, more preferably between about 20 wt % and about 40 wt % solids. A boehmite "paste" refers to a boehmite powder mixed with a small amount of solvent. Generally, a boehmite paste may comprise more than about 80% by weight of solids, preferably between about 80 wt % and about 95 wt % solids, more preferably between about 85 wt % and about 95 wt % solids.

The crystalline boehmite in the crystalline hydrous alumina precursor may be dispersible or substantially non-dispersible in water or an aqueous solution.

The crystalline hydrous alumina precursor may comprise a crystalline boehmite, which is non-dispersible in aqueous solution. A non-dispersible crystalline boehmite may be obtained from a dispersible crystalline boehmite by preheating the dispersible crystalline boehmite at a temperature of from about 250° C. to about 350° C. for a period of from about 20 minutes to about 24 hours, preferably in an oxidizing atmosphere. The temperature is preferably selected to be lower than the temperature required for the formation of a gammaalumina phase. The dispersible crystalline boehmite may be a commercial boehmite as received or as modified, e.g., by spray-drying, or alternatively heat-treated without affecting dispersibility.

In some embodiments, the crystalline hydrous alumina precursor comprises a crystalline boehmite that is dispersible in acid. The acid-dispersible boehmite can be a commercial acid-dispersible boehmite. Without intending to be limited by theory, the acid dispersibility of the crystalline boehmite confers to the stabilized support a greater stability towards the presence of water, especially of steam.

The crystalline hydrous alumina precursor preferably is formed into multi-particle macrostructures before contacting with the structural stabilizer or compound thereof. Without limitation, examples of suitable macrostructures include powder, spheres, pellets, and particles. Such forming may be carried out by any suitable powder forming technique. Without limitation, examples of suitable powder forming techniques include spray-drying, extrusion, tableting, and pelletization. Such macrostructures preferably are micron-sized, e.g., have a minimum dimension in the range of 1 micron, preferably greater than 5 microns, more preferably greater than 10 microns. Such macrostructures preferably have a maximum dimension less than 250 microns, more preferably less than 200 microns. In some embodiments, multi-particle macrostructures have a maximum dimension less than 150 microns.

In preferred embodiments, the crystalline hydrous alumina precursor is essentially free of any aluminum alkoxide. In some embodiments, the crystalline hydrous alumina precursor comprises a crystalline boehmite and does not contain any aluminum alkoxide.

In some embodiments, the crystalline hydrous alumina precursor comprises a single crystalline boehmite or at least one crystalline boehmite with an average crystallite size of from about 4 nm to about 30 nm, preferably from about 6 nm to about 30 nm, more preferably from about 8 nm to about 25 nm, and more preferably from about 4 nm to about 20 nm, still more preferably from about 10 nm to about 25 nm, and most preferably from about 10 nm to about 20 nm. In alternate embodiments, the crystalline boehmite preferably has an average crystallite size in the range of from about 4 nm to about 25 nm, alternatively from about 4 nm to about 20 nm, and alternatively from about 6 nm to about 20 nm, and further alternatively from about 15 nm to about 25 nm. In other alternate embodiments, the boehmite material is a crystalline boehmite with a desired average crystallite size.

The selection of the average crystallite size for the crystalline hydrous alumina precursor is preferably dictated by a desired resistance to hydrothermal degradation of the resulting stabilized support and a desired porosity (e.g., surface area, average pore size, and the like) to provide a suitable surface to deposit catalytic metal(s). Indeed, it has been surprisingly found that the higher the average crystallite size of a crystalline boehmite, the better the hydrothermal resistance to the alumina matrix derived therefrom. It is expected that the average crystalline size of other crystalline hydrous alumina precursors, such as bayerite, gibbsite, and diaspore, would also have an optimum range to provide the desired hydrothermally stable support with a suitable porosity. The low limit of the average crystallite size optimum range may be dictated by a minimum resistance to hydrothermal degradation (e.g., steam resistance); alternatively or additionally, by a maximum surface area and/or minimum average pore size that may be achieved in the stabilized support. The upper limit of the average crystallite size optimum range may be dictated by a minimum surface area and/or a maximum average pore size.

In some embodiments, the crystalline hydrous alumina precursor comprises more than about 75 percent by weight of one crystalline boehmite. In alternate embodiments, the crystalline hydrous alumina precursor comprises more than about 80 percent by weight of one crystalline boehmite.

In other embodiments, the crystalline hydrous alumina precursor comprises two or more crystalline boehmites differing in average crystallite size. When a mixture of boehmites with various average crystallite sizes is used, the mixture of boehmites may comprise a first boehmite having a first average crystallite size and a second boehmite having a second average crystallite size, wherein the first average crystallite size is at least about 1 nm smaller, preferably at least about 3 nm smaller, more preferably at least about 5 nm smaller, than the second average crystallite size. The proportion of the at least two boehmites with different average crystallite sizes depends on the desired properties of stabilized aluminum oxide porous structure. Several mixed-boehmite embodiments are envisioned.

In one embodiment, the crystalline hydrous alumina precursor used to make a stabilized alumina support may comprise at least two boehmites with different average crystallite sizes, with the larger average crystallite size being not more than about 40 nm, and the smaller average crystallite size being more than about 4 nm.

In an alternate embodiment, the crystalline hydrous alumina precursor used to make a stabilized support comprises at least two boehmites with different average crystallite sizes differing by at least about 1 nm.

One embodiment comprises forming a stabilized support from a mixture of at least two boehmite materials with different average crystallite sizes, wherein at least one boehmite has an average crystallite size in the range of from about 4 to about 30 nm, and further wherein the difference between the average crystallite sizes is at least about 1 nm, preferably at least about 3 nm, more preferably more than about 5 nm.

Another embodiment comprises forming a stabilized support using at least two boehmites with different average crystallite sizes, wherein at least one of the boehmites has an average crystallite size preferably in the range of from about 8 nm to about 30 nm, more preferably in the range of from about 8 nm to about 20 nm.

In yet another embodiment, the crystalline hydrous alumina precursor used to make a stabilized support may comprise a boehmite and a pseudoboehmite with different average crystallite sizes, wherein the boehmite average crystallite size is about 6 nm or more, and the pseudoboehmite average crystallite size is about 5 nm or less.

In preferred embodiments when the crystalline hydrous alumina precursor used to make a stabilized support comprises two boehmites of different average crystallite sizes, at least one of the boehmites has an average crystallite size in the range from about 4 nm to about 20 nm or from about 4 nm to about 30 nm, preferably from about 6 nm to about 30 nm, more preferably in the range of from about 8 nm to about 30 nm, and more preferably from about 8 nm to about 25 nm, still more preferably in the range of from about 10 nm to about 25 nm, and most preferably from about 15 nm to about 25 nm, while another boehmite has an average crystallite size preferably in the range of from about 20 nm to about 40 nm, more preferably in the range of from about 20 nm to about 35 nm, most preferably in the range of from about 25 nm to about 35 nm. In an embodiment, such preferred embodiments include the two boehmites differing by at least about 1 nm.

In some embodiments, the crystalline hydrous alumina precursor comprises three or four boehmites with different average crystallites sizes differing from each other by at least about 1 nm, preferably by at least about 3 nm.

In a mixed-boehmite embodiment, the first average crystallite size is preferably in the range of from about 4 nm to about 15 nm, more preferably in the range of from about 8 nm to about 12 nm. The second average crystallite size is in the range of from about 10 nm to about 40 nm, preferably in the range of from about 10 nm to about 30 nm, more preferably in the range of from about 12 nm to about 20 nm. In this preferred mixed-boehmite embodiment, the weight ratio of the first boehmite material with the first average crystallite size to the second boehmite material with the second average crystallite size is preferably from about 1:99 to about 99:1, more preferably from about 99:1 to about 1:99, still more preferably from about 10:90 to about 90:10, and most preferably from about 25:75 to about 75:25. A non-limiting example, for illustration purposes only, includes mixing about equal weights of two boehmites with respective average crystallite sizes of about 10 nm and about 15 nm.

In another mixed-boehmite embodiment, the first average crystallite size is preferably in the range of from about 4 nm to about 10 nm, more preferably in the range of from about 4 nm to about 8 nm. The second average crystallite size may be in the range of from about 10 nm to about 40 nm, preferably in the range of from about 8 nm to about 30 nm, more preferably in the range of from about 10 nm to about 15 nm. It is preferred in this mixed-boehmite embodiment that the first boehmite with the first average crystallite size has a smaller weight fraction than the boehmite with the second average crystallite size. The weight ratio of the first boehmite material with the first average crystallite size to the second boehmite material with the second average crystallite size is preferably from about 1:99 to about 20:80, more preferably from about 1:99 to about 10:90, still more preferably from about 1:99 to about 5:95. A non-limiting example, for illustration purposes only, includes mixing less than about 10% by weight of a boehmite with an average crystallite size of about 4 nm and more than about 90% by weight of a boehmite with an average crystallite size of about 15 nm.

In an alternative mixed-boehmite embodiment, the first average crystallite size is preferably in the range of from about 8 nm to about 20 nm, more preferably in the range of from about 10 nm to about 20 nm. The second average crystallite size is in the range of from about 20 nm to about 40 nm, preferably in the range of from about 20 nm to about 30 nm, more preferably in the range of from about 25 nm to about 30 nm. It is preferred in this alternative mixed-boehmite embodiment that the boehmite with the second average crystallite size has a smaller weight fraction than the boehmite with the first average crystallite size. The weight ratio of the first boehmite material with the first average crystallite size to the second boehmite material with the second average crystallite size is preferably from about 99:1 to about 80:20, more preferably from about 99:1 to about 90:10, still more preferably from about 99:1 to about 95:5. A non-limiting example, for illustration purposes only, includes mixing more than about 90% by weight of a boehmite with an average crystallite size of about 15 nm and less than about 10% by weight of a boehmite with an average crystallite size of about 30 nm.

In other mixed-boehmite embodiments, the first average crystallite size is preferably in the range of from about 10 nm to about 30 nm, more preferably in the range of from about 15 nm to about 25 nm. The second average crystallite size is preferably in the range of from about 25 nm to about 40 nm, more preferably in the range of from about 25 nm to about 35 nm. It is preferred in this mixed-boehmite embodiment that the boehmite with the second average crystallite size has a smaller weight fraction than the boehmite with the first average crystallite size. The weight ratio of the first boehmite material with the first average crystallite size to the second boehmite material with the second average crystallite size is preferably from about 95:5 to about 50:50, more preferably from about 90:10 to about 55:45. A non-limiting example, for illustration purposes only, includes mixing from about 85% to about 55% by weight of a boehmite with an average crystallite size of about 25 nm (e.g., from about 55% to about 90%) and from about 15% to about 45% by weight of a boehmite with an average crystallite size of about 35 nm.

When a combination of boehmites is used in the crystalline hydrous alumina precursor, the boehmites are preferably mixed prior to application of the structural stabilizer or a compound thereof (which may include a catalytically active metal precursor).

Hereinafter, a boehmite material refers to a single boehmite and also to mixtures of two or more boehmites with different average crystallite sizes.

Hereinafter, a crystalline hydrous alumina precursor refers to a single boehmite and also to mixtures of two or more boehmites with different average crystallite sizes as well as a single bayerite, and also to mixtures of two or more bayerites with different average crystallite sizes.

Pre-Treatment of the Crystalline Hydrous Alumina Precursor

The crystalline hydrous alumina precursor can be pre-treated prior to contacting and treating the crystalline hydrous alumina precursor with the structural stabilizer or compound thereof.

In an embodiment, the pre-treatment can comprise spray-drying of a suspension of the crystalline hydrous alumina precursor, preheating of the crystalline hydrous alumina precursor, or combinations thereof. In some embodiments when the crystalline hydrous alumina precursor is pretreated by spray-drying and preheating, the spray-drying step is preferably performed before the preheating step.

Preheating: Pretreating can comprise preheating at a temperature below the temperature of phase transformation from boehmite (aluminum monohydroxide) or bayerite (aluminum trihydroxide) or other crystalline hydrous alumina precursor to an aluminum oxide structure. The preheat treatment can comprise exposing the support material comprising the crystalline hydrous alumina precursor, e.g., boehmite and/or bayerite, in an atmosphere to a temperature preferably ranging from about 250° C. to about 350° C., more preferably from about 300° C. to about 350° C., and most preferably from about 315° C. to about 335° C. The preheat temperature is selected so that substantially all the crystalline hydrous alumina precursor in the sample is retained (e.g., more than 80% of the crystalline hydrous alumina precursor is retained). The atmosphere can comprise molecular oxygen, any inert gas such as nitrogen, or any mixture thereof Preferably, the atmosphere is oxidizing. More preferably, the atmosphere comprises air. Preheating at about 325° C. in air may retain the majority of or all of the crystalline hydrous alumina precursor in the sample. The resulting preheated support material comprising the crystalline hydrous alumina precursor is substantially non-dispersible crystalline hydrous alumina precursor, e.g., non-dispersible boehmite, where non-dispersible refers to non-dispersion in aqueous solution. Without intending to be limited by theory, preheating boehmite at a temperature of from about 250° C. to about 350° C. may produce a substantially non-dispersible boehmite, which may not be dispersible in water or an aqueous solution. The aqueous solution may comprise a catalyst material such as a compound of a catalytic metal and/or a structural stabilizer such as a compound of said structural stabilizer.

Shaping: When the crystalline hydrous alumina precursor is in the form of a powder, the average particle size range of the powder (e.g., an average particle size of 40 microns or less, or an average particle size of 30 microns or less) can also be adjusted to a desired range (e.g., an average particle size of more than 40 microns). The powder may be formed or reformed into a desired shape by a shaping process with optionally the use of suitable additives (i.e., binders and lubricants). A suitable binder may be a compound that can be combusted into a volatile vapor or decomposable during calcination. A binder may be a porous inorganic oxide material or a clay binder. One such preferred inorganic oxide is silica. Other examples of such binder materials include but are not limited to zirconia, magnesia, titania, thoria and boria. These materials can be utilized in the form of a dried inorganic oxide gel or as a gelatinous precipitate. Suitable examples of clay binder materials include but are not limited to bentonite and kieselguhr. The relative proportion of crystalline hydrous alumina precursor to binder material to be utilized is from about 50 wt % to about 99.5 wt %. A proportion of crystalline hydrous alumina precursor to binder from about 75 wt % to about 99 wt % is more preferred. The particle size distribution can be modified, for example, by suspending a boehmite or bayerite powder in a solvent, and spray-drying the suspension of boehmite or bayerite. An optional drying may follow the spray-drying of the boehmite. In preferred embodiments, the crystalline hydrous alumina precursor powder is mixed in a solvent with the structural stabilizer compound to make a slurry that is then fed to a spray-drier, wherein said slurry does not contain a binder. In alternate embodiments, the crystalline hydrous alumina precursor powder is mixed in a solvent to make a slurry that is then fed to a spray-drier, wherein said slurry does not contain a binder. The solvent is preferably water for a substantially dispersible crystalline hydrous alumina precursor or a non-aqueous solvent for a substantially non-dispersible crystalline hydrous alumina precursor. The spray-dried crystalline hydrous alumina precursor preferably has a particle size range of from about 20 microns to about 200 microns. In some embodiments, the spray-dried crystalline hydrous alumina precursor has a weight average particle size from about 30 microns to about 120 microns, preferably from about 50 microns to about 100 microns, more preferably from about 60 microns to about 90 microns. In alternate embodiments, the crystalline hydrous alumina precursor in the powder form is extruded or pelletized to form large particles of size greater than 500 microns or greater than 1 millimeter. In extrusion or pelletization, a lubricant may be added to make the shaping process smoother and faster.

Structural Stabilizer

A "structural stabilizer", as used herein and with reference to the stabilized support and catalyst made therefrom, refers to a compound that acts to minimize or prevent the loss of integrity of the catalyst structure, particularly when it is subjected to a high water partial pressure. Without being limited by theory, change in the structural integrity of the catalyst may be caused by the rehydration of the aluminum oxide matrix to a hydrated form, such as boehmite or pseudoboehmite or gibbsite.

Suitable structural stabilizers include tungsten (W), tantalum (Ta), niobium (Nb), thorium (Th), germanium (Ge), uranium (U), tin (Sn), antimony (Sb), vanadium (V), hafnium (Hf), sodium (Na), potassium (K), boron (B), aluminum (Al), magnesium (Mg), silicon (Si), calcium (Ca), titanium (Ti), chromium (Cr), manganese (Mn), iron (Fe), cobalt (Co), nickel (Ni), copper (Cu), zinc (Zn), gallium (Ga), selenium (Se), strontium (Sr), zirconium (Zr), barium (Ba), thorium (Th), and the lanthanides, including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), oxides thereof, or combinations thereof. The structural stabilizer preferably comprises at least one element selected from the group consisting of cobalt, magnesium, manganese, zirconium, boron, aluminum, barium, silicon, lanthanum, zinc, oxides thereof, and any combination thereof. More preferably, the structural stabilizer comprises at least one element selected from the group consisting of cobalt, magnesium, manganese, zirconium, aluminum, boron, barium, silicon, lanthanum, oxides thereof, and any combination thereof. Most preferably, the structural stabilizer comprises at least one element selected from the group consisting of cobalt, magnesium, manganese, zirconium, aluminum, silicon, oxides thereof, and any combination of two or more thereof. In some embodiments, the structural stabilizer may include one or more oxides of these elements.

The structural stabilizer may be contacted with the boehmite material in the form of a compound containing said structural stabilizer. When the contacting step comprises mixing the boehmite material and the compound of the structural stabilizer in a solvent, the compound of the structural stabilizer may be soluble (e.g., dissolved in the solvent suspending the boehmite) in said solvent; alternatively, it may be insoluble in said solvent (e.g., in the form of small solid particles suspended or dispersed in the solvent). The compound of the at least one structural stabilizer may be in the form of a salt, an acid, a hydroxide, an oxide of the structural stabilizer, an organic compound of the structural stabilizer, or any combination of two of more thereof. Suitable compounds of the structural stabilizer soluble in the solvent can include, for example but not limited to, salts thereof, acids thereof, and hydroxides thereof. Without limitation, an example of suitable compounds of the structural stabilizer insoluble in the solvent includes an oxide of the structural stabilizer. In some embodiments, the compound of the structural stabilizer comprises a colloidal suspension of an oxide of the structural stabilizer. In other embodiments, the compound of the structural stabilizer comprises a colloidal suspension of an oligomer of an acid and an oxide of the structural stabilizer. The compound of the structural stabilizer may be inorganic or organic. Non-limiting examples of inorganic compounds of the structural stabilizer include nitrate salts and chloride salts. Non-limiting examples of organic compounds of the structural stabilizer include alkoxides, acetate salts, lactate salts, oxalate salts, and carboxylic acids. In some embodiments, the compound of the structural stabilizer excludes an alkoxide of the structural stabilizer.

By way of example, when the structural stabilizer comprises silicon, a colloidal suspension of silicon oxide may be used as the structural stabilizer compound. Commercial sources of colloidal silicas are available from Grace Davison (Columbia, Md.) under the Trademark Ludox®; and from WesBond Corporation (Wilmington, Del.) under the Trademarks Megasol® and Nyacol®. Other suitable compounds of silicon include ammonium silicate [e.g., of formula $(SiO_2)x \cdot (NH_4)_2O$ with x between 2 and 6], sodium silicate ($Na_2Si_3O_7$), calcium silicate ($CaSiO3$), tetraalkyl orthosilicate (e.g, tetramethyl orthosilicate ($Si(OCH_3)_4$,), tetraethyl orthosilicate ($C_8H_{20}O_4Si$), tetrapropyl orthosilicate (($CH_3CH_2CH_2O)_4Si$,), tetraisopropyl orthosilicate ($C_{12}H_{28}O_4Si$), tetrabutyl orthosilicate (($CH_3CH_2CH_2CH_2O)_4Si$,), tetrahexyl orthosilicate, tetraallyl orthosilicate ($C_{12}H_{20}O_4Si$), silicon tetraboride ($SiB4$), silicon tetraacetate ($Si(OCOCH_3)_4$,), zirconium silicate ($ZrSiO_4$), silicic acid ($H_2O_3Si$), or a silica-alumina gel.

By way of example, when the structural stabilizer comprises at least one element selected from the group consisting of magnesium, zirconium, aluminum, barium, lanthanum, zinc, oxides thereof, and any combination thereof, suitable structural stabilizer compounds include but are not limited to nitrate salts, such as magnesium nitrate (e.g., $Mg(NO_3)_2 \cdot 6H2O$), zirconium nitrate (e.g., $ZrO(NO_3)_2 \cdot xH_2O$), aluminum nitrate (e.g., $Al(NO_3)_3 \cdot 9H_2O$), barium nitrate (e.g., $Ba(NO_3)_2$), lanthanum nitrate (e.g., $La(NO_3)_3 \cdot 6H_2O$,) or zinc nitrate (e.g., $Zn(NO_3)_2 \cdot 6H_2O$).

By way of another example, when the structural stabilizer comprises boron, suitable boron-containing compounds include boric acid, trimethyl borate (e.g., $B(OCH_3)_3$), triethyl borate (e.g., $(C_2H_5O)_3B$), tripropyl borate (e.g., $(CH_3CH_2CH_2O)_3B$), triisopropyl borate (e.g., $[(CH_3)_2CHO]_3B$), and tri-tert-butyl borate (e.g., $[(CH_3)_3CO]_3B$).

In some embodiments, the structural stabilizer comprises a catalytic metal. Preferred catalytic metals that can be used as a structural stabilizer include cobalt or iron, more preferably cobalt. Those skilled in the art would be able to select the most suitable catalytic-metal containing compound for use in preparing the stabilized support. By way of example, when the structural stabilizer comprises cobalt, suitable cobalt-containing precursor compounds include but are not limited to hydrated cobalt nitrate (e.g. cobalt nitrate hexadydrate), cobalt carbonyl, cobalt acetate, cobalt acetylacetonate, and cobalt oxalate. Other particular catalytic metals that may be included are corresponding salts and compounds of nickel and/or molybdenum. A combination of these metals may be used in certain reactions, i.e. hydrodeoxygenation reactions.

An alternate embodiment comprises the use of at least two elements in the structural stabilizer, with one element having more acidity than the other(s). It is envisioned that adding a small amount of acidic sites, preferably well-dispersed acidic sites, within the stabilized support structure may be particularly desirable for the making of the catalyst. Without limiting the invention and as an example of such an alternate embodiment, the structural stabilizer can comprise a mixture of inorganic oxides, such as silica, alumina, titania, zirconia, magnesia, boria, ceria, thoria, and combinations thereof. Preferably, the structural stabilizer comprises a silica-alumina material with a molar ratio of silica to alumina between about 1:1 and about 500:1, more preferably between about 3:1 and about 500:1. In a preferred embodiment, the silica-alumina material comprises co-precipitated silica-alumina. In such a preferred embodiment, a suitable compound for the silica-alumina stabilizer includes a co-precipitated silica-alumina gel.

Method of Making the Stabilized Support

Without being limited by theory, the preparation history of the stabilized support may have an impact on the type of aluminum oxide structure that is ultimately generated from the boehmite material. In an embodiment, the stabilized support is made by a method that includes contacting a crystalline hydrous alumina precursor with a structural stabilizer or a compound thereof and then treating said crystalline hydrous alumina precursor in the presence of said structural stabilizer or compound thereof. In preferred embodiments, the crystalline hydrous alumina precursor comprises one or more one crystalline boehmites; one or more crystalline bayerites; or combinations thereof. The treating can be applied before or after the contacting.

In an embodiment, contacting the crystalline hydrous alumina precursor with a structural stabilizer may include forming a mixture of the structural stabilizer or compound thereof with the crystalline hydrous alumina precursor. In some embodiments, the mixture includes a solvent that may maintain the solid crystalline hydrous alumina precursor in suspension or dispersed. The mixture can be in the form of a slurry or a sol. The structural stabilizer or compound thereof may also be suspended in the solvent (when insoluble in said solvent) or dissolved in said solvent (when soluble in said solvent). In preferred embodiments, contacting includes applying (e.g., impregnating) the structural stabilizer or compound thereof onto the crystalline hydrous alumina precursor. It should be understood that more than one structural stabilizer or more than one compound of a structural stabilizer can be used. In embodiments wherein the crystalline hydrous alumina precursor comprises two or more crystalline boehmites, contacting may include mixing first the two or more crystalline boehmites in a solvent and adding the structural stabilizer or compound thereof to said boehmite mixture. Alternatively, the structural stabilizer or compound thereof may be suspended in a solvent (when insoluble in said solvent) or dissolved in a solvent (when soluble in said solvent), and the two or more crystalline boehmites added to the suspension or solution of the structural stabilizer or compound thereof, either separately or mixed, in the form of a crystalline hydrous alumina precursor powder or as a crystalline hydrous alumina precursor slurry (e.g., powder suspended in a solvent). If a solvent is used for first preparing the suspension or solution of the structural stabilizer and the boehmite mixture, the solvents may be the same, such as water, but may also be different such as water and an organic solvent. In preferred embodiments, the two or more crystalline boehmites are in the form of powders, and contacting includes mixing the boehmite powders to form the boehmite material, and then applying (e.g., impregnating) the structural stabilizer or compound thereof onto the boehmite material.

In an embodiment, treating the crystalline hydrous alumina precursor includes calcining the crystalline hydrous alumina precursor in contact with the structural stabilizer or compound thereof. The terms "calcination" or "calcining" refer to a heat treatment at an elevated temperature of at least about 200° C. in an oxidizing environment (such as air). Such "calcination" or "calcining" may be performed to transform a decomposable compound of the structural stabilizer into an oxide form, as well as to remove any residual solvent that may be used during contacting of the structural stabilizer or compound thereof with the crystalline hydrous alumina precursor. In an embodiment, the contacted crystalline hydrous alumina precursor is subjected to at least one heat treatment such as a "high temperature" treatment. High temperature treatment refers to a temperature sufficient to effect the conversion of the crystalline hydrous alumina precursor to a stabilized aluminum oxide structure. In an embodiment, the high temperature treatment includes a temperature of about 450° C. or higher, preferably a temperature of about 500° C. or higher, more preferably a temperature of about 600° C. or higher. In an alternative embodiment, the high temperature treatment includes a temperature of less than about 900° C., preferably less than about 850° C. In other alternative embodiments, the high temperature treatment includes a temperature of about 900° C. or more, preferably between about 900° C. and about 1600° C., more preferably between about 1000° C. and about 1500° C. In some embodiments, treating may include drying before calcining.

In an embodiment, the preparation of the stabilized support may further include shaping the crystalline hydrous alumina precursor. In some embodiments, preparation of the stabilized support may include contacting the crystalline hydrous alumina precursor with a structural stabilizer or a compound thereof, then shaping the crystalline hydrous alumina precursor, and then treating (e.g., high temperature treating) the crystalline hydrous alumina precursor in the presence of the structural stabilizer or compound thereof. In alternative embodiments, preparation of the stabilized support may include shaping the crystalline hydrous alumina precursor, then contacting the crystalline hydrous alumina precursor comprising boehmite with a structural stabilizer or a compound thereof, and then treating (e.g., high temperature treating) the crystalline hydrous alumina precursor in the presence of the structural stabilize or compound thereof. In another alternative embodiment, a "low temperature" treatment may be performed after shaping the crystalline hydrous alumina precursor. A low temperature treatment includes a temperature sufficient to retain a majority (i.e, at least about 50%) of the crystalline hydrous alumina precursor, preferably to retain a substantial portion (i.e., at least about 80%) of the crystalline hydrous alumina precursor. In an embodiment, the low temperature treatment includes a temperature of about 350° C. or less. For instance, an embodiment may include drying at a temperature of between about 70° C. and about 150° C. or calcining between about 150° C. and about 350° C.

It is to be understood that dehydration of crystalline hydrous alumina precursor (e.g., by calcination) may produce a certain distribution of pores in the resulting catalyst support. Some interparticle pores are developed from the packing of the particles of the crystalline hydrous alumina precursor powder and originate from inter-particle spaces (i.e., spaces in between the boehmite particles), while other pores are formed by the loss of water from crystals of crystalline hydrous alumina precursor such as alumina monohydrate. Pore size control of the stabilized support can therefore be effected by the selection of an optimum average crystallite size of the crystalline hydrous alumina precursor or the use of a mixture of two or more crystalline boehmites differing in average crystallite size in the crystalline hydrous alumina precursor, as well as by the calcination conditions. Without limitation, examples of suitable calcination conditions include the selected calcination temperature; the holding time at the selected calcination temperature; the heating ramp (e.g., 1-10° C./min) to the selected calcination temperature; the use of steam during calcination (or not using steam during calcination); calcination at atmospheric pressure or above or under vacuum. In an embodiment, the method of making the stabilized support further includes contacting a pore-regulating agent with the crystalline hydrous alumina precursor before the shaping step to further control the pore size and pore distribution of the stabilized support. The contact with the pore-regulating agent may be simultaneous to contacting the crystalline hydrous alumina precursor with the structural stabilizer or compound thereof. In an alternative embodiment, the contact with the pore-regulating agent may be before or after contacting the crystalline hydrous alumina precursor with the structural stabilizer or compound thereof. In such an alternate embodiment, the crystalline hydrous alumina precursor may be exposed to a "low temperature" treatment between contacting the crystalline hydrous alumina precursor with the pore-regulating agent and contacting the crystalline hydrous alumina precursor with the structural stabilizer or compound thereof. In another alternative embodiment, contacting the crystalline hydrous alumina precursor with the pore-regulating agent may be accomplished after contacting with the structural stabilizer or compound thereof.

In an embodiment, the pore-regulating agent may be a compound that is decomposable under the calcination conditions. Without being limited by theory, a pore-regulating agent may help control pore size by reactivity to a particular functional group that influences pore size (e.g., reaction with alumina or aluminum hydroxide) and/or by physical separation of crystallites or particles (e.g., agglomerates of crystallites) of the crystalline hydrous alumina precursor acting as a "space-filling" factor. Further without being limited by theory, the pore-regulating agent may be positioned in the spaces inbetween the crystalline hydrous alumina precursor particles. For instance, upon decomposition of the pore-regulating agent, there may be new formed "holes" (i.e., pores), or the pore size may be enlarged by a "bulky" agent or reduced such as by cross-linking or peptization. The selection of the pore-regulating agent may be directed to its mode of action (e.g., reactivity and/or space-filling), size, its impact on certain pores (e.g., micropores of less than 1.5 nm; mesopores between 1.5 nm and 20 nm, macropores greater than 20 nm) and decomposition temperature. The pore-regulating agent may be used for example to change the average pore size, narrow the pore distribution, or create a bimodal pore distribution. Non-limiting examples of pore-regulating agents include acids (e.g., nitric acid, acetic acid, any polycarboxylic acid containing between 2 and 22 carbon atoms); alkalis such as ammonium hydroxide and/or ammonium salts, either used separately or used simultaneously, wherein the ammonium salt may be ammonium carbonate; ammonium bicarbonate; ammonium formate; ammonium acetate; ammonium propionate; tetra-alkyl ammonium with alkyl being methyl, ethyl, propyl, or butyl, or any combination thereof; graphite; ethylene oxide; ethylene glycol; propylene oxide; propylene glycol; acrylamide; ethylene amine; polymers (e.g., any polyethylene oxide, any polyethylene glycol, any polypropylene glycol, any polyethylene amine, any polyacrylamide, and any polyvinyl alcohol); cellulose; methyl cellulose; any methyl cellulose ether; and any combination of two or more thereof such as mixtures of polyethylene glycol and methyl cellulose.

Impact of Structural Stabilizer on Calcined Crystalline Hydrous Alumina Precursor Without being limited by theory, when a crystalline hydrous alumina precursor is impregnated with a catalytic metal precursor and then calcined to form the support, said calcination being performed at a temperature (e.g., >350° C.) sufficient to decompose the catalytic metal precursor but at a temperature (e.g., <800° C.) less than the temperature at which loss of support surface area is appreciable, the catalyst made therefrom may have a higher hydrothermal stability than a catalyst made from a calcined crystalline hydrous alumina precursor without impregnation with a catalytic metal precursor. In some instances, the catalytic metal precursor may migrate into the boehmite during the calcination, which may cause the size of the pores of the calcined boehmite to change and may result in not achieving the desired pore size on the catalyst support. As a result, the performance of the ensuing stabilized supported catalyst during a subsequent hydrogenation process may be compromised. For instance, reactant conversion and desired selectivities may not be as high as desired.

Further without being limited by theory, the addition of either a catalytic metal precursor or a structural stabilizer compound to the crystalline hydrous alumina precursor, such as a crystalline boehmite or bayerite may also have an impact on the microstructure of the resulting aluminum oxide matrix, as it tends to reduce the pore size of the resulting aluminum oxide matrix. For example, the average pore size of the stabilized support resulting from the calcination of a boehmite in contact with a structural stabilizer compound is smaller than that of a support resulting from the calcination of said boehmite without the structural stabilizer compound. Hence, this may lead to the selection of a crystalline hydrous alumina precursor with a larger crystallite size to mitigate this reduction in pore size by the structural stabilizer compound.

Methods Employing a Single Crystalline Hydrous Alumina Precursor with an Optimum Average Crystallite Size Without being limited by theory, the original crystalline structure of the crystalline hydrous alumina precursor as well as the type and feedstock of the structural stabilizer may affect the microstructure of the resulting aluminum oxide matrix in the stabilized support obtained after the treating step. For example, it has been discovered that, for the preparation of a catalyst support (whether it is modified by a structural stabilizer or not) for strong Fischer-Tropsch catalysts, the larger the average crystallite size of the boehmite material to be used, the stronger the resistance to chemical or mechanical changes of the resulting support after calcination. Furthermore, the total surface area of the support obtained therefrom decreases, which implies that the average pore size may increase with the average crystallite size of the single boehmite. Further without being limited by theory, larger pore sizes in the support obtained from a single crystalline hydrous alumina precursor may improve diffusion of product hydrocarbons, and the porous structure of the resulting aluminum oxide matrix may depend on the original crystallite size of the crystalline hydrous alumina precursor.

Without being limited by theory, since the average pore size of a porous support may correlate with the average crystallite size of a metal deposited thereon, (see for example, "Characteristic feature of Co/SiO$_2$ catalysts for slurry phase Fischer-Tropsch synthesis" by Sun et al. in J. Chem. Eng. Jpn. (2000), Volume 33(2), Pages 232-238; "Silica supported cobalt Fischer-Tropsch catalysts: effect of pore diameter of support" by Saib et al. in Catalysis Today (2002), Volume 71, Pages 395-402; "Supercritical Phase Fischer-Tropsch Synthesis: Catalyst Pore-size Effect" by Fan et al. in AIChE Journal (1992) Volume 38 No. 10, Pages 1639-1648) larger pore sizes in the stabilized support obtained from a single boehmite may increase the average crystallite size of a Fischer-Tropsch catalytically active metal deposited on the stabilized support (e.g., by impregnation). For instance, the crystallite size of cobalt may have an impact not only on the intrinsic activity of the cobalt-based catalyst but also on the stability of this activity over time. A larger cobalt average crystallite size may result in higher resistance to steam oxidation (i.e., increase stability of activity) but may also lower the intrinsic activity as less and less of the deposited cobalt is accessible to the reactants. Smaller cobalt crystallite sizes may result in higher intrinsic activity but may also confer poorer resistance to steam oxidation and conversion to cobalt oxide. Further without being limited by theory, the average pore size of the support may be sufficiently small to provide adequate catalyst activity (e.g, by reducing the active metal crystallite sizes), but not so small that it results in mass transfer limitation (e.g., by diffusion constraints) and formation of very small oxidation-prone Fischer-Tropsch metal crystallites. Hence, it has been discovered that for a stable performant Fischer-Tropsch catalyst, there is in general a selection of an optimum range of cobalt crystallite sizes, which is based on a compromise between high intrinsic activity and stability of the activity over time. It has been further found that the optimum crystallite size for the Fischer-Tropsch metal may be determined in part by the selection of an average crystallite size for a single boehmite from an optimum range of boehmite crystallite sizes. Moreover, the addition of a structural stabilizer in this aluminum oxide matrix derived from the boehmite material may further prevent or reduce its subsequent degradation by hydrothermal action (e.g., rehydration in the presence of high temperature and pressure steam to a boehmite or pseudoboehmite phase).

Therefore, in some embodiments, a stabilized support is made by methods employing a single crystalline hydrous alumina precursor comprising an average crystallite size selected from an optimum size range.

One embodiment for making a stabilized catalyst support with an enhanced hydrothermal stability includes a) contacting a crystalline hydrous alumina precursor with at least one structural stabilizer or a compound thereof, wherein the crystalline hydrous alumina precursor includes at least one crystalline boehmite comprising an average crystallite size selected from a desired optimum range between about 4 nm and about 30 nm; b) shaping the contacted crystalline hydrous alumina precursor in the presence of the compound of the at least one structural stabilizer so as to form a shaped support precursor of a desired average particle size, wherein the shaped support precursor comprises the at least one crystalline boehmite and the at least one structural stabilizer compound; and c) treating the shaped support precursor. In an embodiment, the shaped precursor is treated under suitable calcination conditions to effect the conversion of the at least one crystalline boehmite to a stabilized aluminum oxide structure and to generate a stabilized catalyst support.

In preferred embodiments, the crystalline hydrous alumina precursor comprising at least one crystalline boehmite is in the form of a powder before the shaping. In some embodiments, the at least one crystalline boehmite is dispersible. In alternate embodiments, the at least one crystalline boehmite is non-dispersible.

In some embodiments, the crystalline hydrous alumina precursor may be in the form of a slurry or sol before the shaping, wherein the slurry or sol comprises a crystalline hydrous alumina precursor powder dispersed in a solvent. The solvent in the slurry or sol may be aqueous, but may be organic. The solvent in the slurry or sol may contain an acid to facilitate the dispersion of the crystalline hydrous alumina precursor powder.

In an embodiment, contacting a crystalline hydrous alumina precursor with at least one structural stabilizer or compound thereof includes forming a mixture of the compound of at least one structural stabilizer and the crystalline hydrous alumina precursor powder in a solvent, wherein the compound of at least one structural stabilizer is insoluble in said solvent. In an alternative embodiment, the contacting includes forming a mixture of a compound of at least one structural stabilizer and the crystalline hydrous alumina precursor powder in a solvent, wherein the compound of at least one structural stabilizer is dissolved in said solvent.

Shaping the contacted crystalline hydrous alumina precursor preferably generates particles of the shaped support precursor. In an embodiment, such particles have a particle size between about 10 microns and about 250 microns, more preferably between about 20 microns and about 200 microns. In an alternative embodiment, shaping the contacted crystalline hydrous alumina precursor generates shaped support precursor particles comprising a particle size greater than about 0.5 mm. Shaping of the crystalline hydrous alumina precursor may be accomplished by any suitable method. Without limitation, examples of suitable methods include spray-drying, pelletization, and/or extrusion.

In some embodiments, the desired average particle size is between about 30 microns and about 150 microns. In preferred embodiments, the desired average particle size is between about 50 microns and about 100 microns, more preferably between about 60 microns and about 90 microns.

In an embodiment, contacting the crystalline hydrous alumina precursor with the structural stabilizer or compound thereof preferably includes forming a mixture comprising a crystalline hydrous alumina precursor and a compound of the structural stabilizer in a solvent. The crystalline hydrous alumina precursor preferably comprises one or more crystalline boehmites in the form of a powder, such as comprising primarily micron-sized particles. The mixture may have a solid content of from about 20% to about 95% by weight of the total mixture weight. The mixture may be a sol or a slurry, preferably containing said boehmite powder or powders, with a solid content of from about 20% to about 60% by weight of the total mixture weight, preferably from about 20% to about 45% by weight of the total mixture weight, more preferably from about 20% to about 40% by weight of the total mixture weight. The mixture may be a paste, preferably containing said crystalline hydrous alumina precursor powder or powders, with a solid content of from about 80% to about 95% by weight of the total mixture weight, preferably from about 80% to about 90% by weight of the total mixture weight. More than one structural stabilizer or more than one compound of a structural stabilizer may be used to form the mixture. In an embodiment, the shaped support precursor may be dried before being calcined. Drying may include conventional drying (such as in an oven; a rotary calciner or dryer; a drum dryer; an indirect-heat dryer; a direct-heat dryer; a fluidized bed dryer; a tubular dryer; tunnel kiln; a muffle furnace; a box furnace; a belt dryer; a band dryer; or any combination thereof) and/or spray drying.

In an alternative embodiment, contacting the crystalline hydrous alumina precursor with a structural stabilizer or compound thereof includes forming a sol comprising a crystalline hydrous alumina precursor and a compound of the structural stabilizer. The sol may have a solid content of from about 20% to about 60% by weight of the total sol weight. In an embodiment wherein the shaped support precursor is dried by spray drying, the sol may have a solid content of from about 20% to about 45% by weight of the total sol weight; preferably a solid content of from about 20% to about 40% by weight of the total sol weight. It should be understood that more than one structural stabilizer or more than one compound of a structural stabilizer may be added to the sol. Forming the sol can also comprise dispersing the crystalline hydrous alumina precursor in a solvent to form a sol and adding a compound of the structural stabilizer to the sol or can comprise dispersing a compound of the structural stabilizer in a solvent to form a sol and adding the crystalline hydrous alumina precursor to the sol. Alternatively, forming the sol can include dispersing the crystalline hydrous alumina precursor in a first solvent to form a first sol, dispersing a compound of at least one structural stabilizer in a second solvent to form a second sol or a solution, and combining the first sol with the second sol or solution. Without being limited by theory, this embodiment of the method of making a stabilized support may be useful when the first solvent used to make the crystalline hydrous alumina precursor sol would not be suitable for the compound of the structural stabilizer.

In another embodiment, forming the mixture includes dispersing the crystalline hydrous alumina precursor in a first solvent to form a sol, dispersing a compound of at least one structural stabilizer in a second solvent to form a gel, and combining the sol and the gel to make a slurry. In this embodiment, it may be desirable to contact the crystalline hydrous alumina precursor with one inorganic oxide or a combination of inorganic oxides. For instance, a sol comprising the crystalline hydrous alumina precursor may be formed and one oxide of a structural stabilizer or a combination of oxides of structural stabilizers, such as inorganic oxides, may be dispersed in a solvent to form a gel with inorganic oxide(s). The sol and the inorganic oxide gel may be combined to form the mixture. Preferably, forming a gel with inorganic oxide(s) comprises precipitating the inorganic oxide or co-precipitating at least two inorganic oxides. The inorganic oxide gel preferably comprises a co-precipitated silica-alumina gel. The silica-alumina gel may have a molar ratio of silica to alumina between about 500:1 and about 1:1, preferably between about 500:1 and about 3:1. The silica-alumina gel is preferably made by the co-precipitation of an aluminate compound and a silicate compound (for example, sodium aluminate and sodium silicate) with the addition of an acid (such as nitric acid) by adding an acid so as to form a co-precipitated silica-alumina gel. Sufficient amounts of aluminate compound and silicate compound may be selected to produce a molar ratio of silica to alumina between about 500:1 and about 1:1, preferably between about 500:1 and about 3:1. A hydrogel may be obtained within a few seconds to several hours, and the gelation pH may be above about 7, preferably between about 9 and about 11. The hydrogel may then be aged for more than about 0.5 hour, preferably not more than about 80 hours at room temperature.

An alternate method to forming the stabilized support comprises forming a boehmite sol by dispersing a boehmite material in a solvent to form a boehmite sol, spray-drying the boehmite sol to form spray-dried boehmite, and depositing a structural stabilizer compound to the spray-dried boehmite.

In another method, contacting a boehmite material with a structural stabilizer or compound thereof includes forming a boehmite sol by dispersing the boehmite material and a structural stabilizer compound in a solvent to form the boehmite sol and spray-drying the boehmite sol in the presence of the structural stabilizer to form spray-dried boehmite, which comprises the structural stabilizer.

Yet another method for making a stabilized catalyst support with an enhanced hydrothermal stability includes a) shaping a crystalline hydrous alumina precursor comprising at least one crystalline boehmite to form a shaped boehmite material in the form of particles with a desired average particle size, wherein the at least one crystalline boehmite comprises an average crystallite size selected from a desired range from about 4 nm to about 30 nm; b) optionally, heat-treating the shaped crystalline hydrous alumina precursor to a temperature not exceeding 350° C. so as to retain a substantial portion of the at least one crystalline boehmite; c) contacting the shaped crystalline hydrous alumina precursor with at least one structural stabilizer or a compound thereof; and d) treating the shaped crystalline hydrous alumina precursor in the presence of the at least one structural stabilizer or compound thereof under suitable conditions to effect the conversion of the at least one crystalline boehmite to a stabilized aluminum oxide structure and to generate a stabilized catalyst support. In some instances, contacting the shaped crystalline hydrous alumina precursor includes forming a mixture of a compound of at least one structural stabilizer and a crystalline hydrous alumina precursor powder in a solvent, wherein the compound of at least one structural stabilizer is dissolved in said solvent. Particularly, contacting may comprise impregnation of a compound of the at least one structural stabilizer onto the shaped crystalline hydrous alumina precursor.

Yet another alternate method for making a stable catalyst support comprises a) forming a mixture of a crystalline hydrous alumina precursor comprising a boehmite or a bayerite and at least a portion of a structural stabilizer; b) drying the mixture; c) treating the dried mixture comprising said portion of structural stabilizer and still further comprising said boehmite or said bayerite and to form a partially-stabilized support; d) applying another portion of the structural stabilizer to the partially-stabilized support to form a support precursor; and e) treating the support precursor to form a stabilized support.

In alternative embodiments, an additional amount of at least one structural stabilizer is added to the stabilized support. Such an additional amount may be the same or different than the at least one structural stabilizer contacted with the crystalline hydrous alumina precursor.

In alternative embodiments, one structural stabilizer may be incorporated into the support by means of different techniques. For instance, drying the mixture (such as a sol) containing the crystalline hydrous alumina precursor and a compound of the structural stabilizer may deposit a fraction of the stabilizer to form a partially-stabilized dried material, and then another fraction of the stabilizer may be deposited (e.g., by impregnation, precipitation, or chemical vapor deposition) to the partially-stabilized dried material to form a stabilized support. In other embodiments, any combination of techniques may be used to deposit a structural promoter or several structural promoters to the partially-stabilized material.

In further embodiments, two or more structural stabilizers may be incorporated into the support by means of several techniques. For instance, a first stabilizer may be deposited by drying a mixture (such as a sol) containing the crystalline hydrous alumina precursor and a compound of said first structural stabilizer to form a partially-stabilized dried material, and a second stabilizer may be deposited on the partially-stabilized dried material using a method such as impregnation, precipitation, or chemical vapor deposition to obtain a stabilized support. In other embodiments, any combination of techniques may be used to deposit one structural stabilizer or several structural stabilizers (sometimes called structural promoters) to the partially-stabilized dried material.

In an additional embodiment, contacting the crystalline hydrous alumina precursor with the structural stabilizer to form the precursor support includes dispersing the crystalline hydrous alumina precursor in a solvent to form a sol, drying the sol so as to form a dried crystalline alumina precursor, and then depositing one or more structural stabilizers to the dried crystalline alumina precursor to form the support precursor. The deposition may be done using any suitable technique. Without limitation, examples of suitable techniques include incipient wetness impregnation, precipitation, and chemical vapor deposition. In other embodiments, any combination of techniques may be used to deposit a structural promoter or several structural promoters to the dried crystalline alumina precursor.

When a structural stabilizer is deposited by impregnation to a dried crystalline alumina precursor (partially stabilized or not), the compound containing the structural stabilizer is preferably dissolved in an organic solvent.

Suitable solvents for the preparation of the mixture with the crystalline hydrous alumina precursor include water and/or an organic solvent such as methanol, acetone, ethanol, and the like. Suitable compounds of the structural stabilizer soluble in the solvent can include, for example but not limited to, salts thereof, acids thereof, hydroxides thereof, and oxides thereof.

In some embodiments, when the solvent comprises water, the pH of the sol may be below about 7. Preferably, the pH of the sol is between about 3 and about 7 and more preferably between about 4 and about 6. Acids or acidic solutions, such as acetic acid, nitric acid, formic acid, boric acid, or combinations thereof can be added to the sol in order to adjust the pH of the sol. Without being limited by theory, acids may act as peptizing agents, which strengthen the molecular structure of the material by creating shorter bonds between molecules and tightening the structural lattice. The acidic condition during drying (conventionally drying or spray drying) may then confer greater structural integrity to the support. The peptizing agent is preferably used when the crystalline hydrous alumina precursor is substantially non-dispersible, to facilitate its dispersion in the sol.

Treating the support precursor may include calcining and/or drying. The support precursor is preferably calcined in an oxidizing atmosphere. Calcining can be performed at a temperature between about 450° C. and about 900° C., alternatively between about 450° C. and about 850° C., preferably between about 500° C. and about 850° C., more preferably between about 600° C. and about 850° C. In some embodiments, calcining may be performed at temperatures between about 600° C. and about 750° C. In other embodiments, calcining includes temperatures of about 450° C. or higher, alternatively about 500° C. or higher, and alternatively about 600° C. or higher. Alternatively, calcining may be performed at a temperature between about 500° C. and about 800° C., alternatively between about 500° C. and about 775° C., and alternatively between about 500° C. and about 750° C., and further alternatively between about 550° C. and about 850° C. In another alternative embodiment, the calcination temperature may be about 900° C. or more, preferably between about 900° C. and about 1600° C., more preferably between about 1000° C. and about 1500° C., and more preferably between about 1100° C. and about 1600° C., and still more preferably between about 1100° C. and about 1400° C. Calcining may proceed from 0.5 to 36 hours. Calcining at a pressure of about 100 kPa or higher is desirable. In an embodiment, the calcining may be performed at a pressure from about 0 to about 500 kPa (about 0 to about 5 atm), more preferably from about 100 to about 500 kPa (about 1 atm to about 5 atm), most preferably from about 100 to about 105 kPa (about 1 atm). Calcining in an oxidizing atmosphere preferably achieves oxidation of any deposited compound or salt of the structural stabilizer to an oxide compound of the structural stabilizer. When the preparation of the support comprises multiple techniques such as spray drying followed by impregnation, chemical vapor deposition, or precipitation, calcining in an oxidizing atmosphere preferably proceeds after the last technique is used but can also be done after each technique is used.

In some embodiments, the support precursor may be dried before or after calcining In alternative embodiments, the support precursor is not calcined but is instead dried. Drying the support precursor preferably occurs at a temperature between about 75° C. and about 200° C., more preferably between about 80° C. and about 150° C. Drying may proceed from 0.5 to 36 hours at a pressure of from 0 atm to about 10 atm, more preferably from about 0 to about 5 atm, most preferably at about 1 atm. When drying is performed by spray-drying, spray-drying comprises passing the mixture through a spray-drier with an inlet temperature of from about 200° C. to about 425° C. and an outlet temperature from about 100° C. to about 140° C. In large-scale preparation, the drying step preferably comprises at least one spray-drying step. When the preparation of the support comprises multiple techniques such as for example, spray drying followed by impregnation, chemical vapor deposition, or precipitation, the treatment of the support precursor by drying preferably proceeds after each technique is used.

Methods Employing Two or More Boehmites with Differing Average Crystallite Sizes Extensive work is needed to optimize the relationship between the porosity of the support structure (e.g., average pore size, surface area, pore volume) and Fischer-Tropsch metal crystallite size. However, considerations based on possible diffusional limitations of the resulting catalyst are generally neglected.

The porosity of a support is defined as the total pore volume inside a support particle. This porosity can be divided into different fractions as defined by the pore diameter. The largest pores are called macropores, these are defined as pores greater than 75 nanometers (nm) in diameter. The mesopores are those between 8 nm and 75 nm, and the micropores are those below 8 nm. The surface area is primarily located in the microporosity, whereas the macroporosity is important for the transport and diffusion of molecules to this surface area. As described earlier, the porosity (e.g., the average pore size and surface area) of the resulting stabilized support comprising the aluminum oxide matrix is dictated not only by the original boehmite material but also the type and the amount used of the structural stabilizer, and one can select a single boehmite with an average crystallite size within an optimal range so as to achieve a hydrothermally stable support structure with a desired porosity (e.g., average pore size and/or surface area) to support the deposited catalytic metal and further achieve high intrinsic activity of the supported catalyst derived therefrom.

It has been surprisingly discovered that a mixture of equal amounts (by weight) of two boehmite materials with different average crystallite sizes of 10 and 15 nm may form a Fischer-Tropsch catalyst with relatively high activity, good selectivity, good attrition resistance, and good catalytic stability, all of which may be equal to or superior than catalysts derived from a boehmite material with a single crystallite of 10 nm or 15 nm. Similarly, mixtures containing a small weight fraction of a boehmite material with an average crystallite size of about 4 nm and a large weight fraction of a boehmite material with an average crystallite size of 10 or 15 nm form Fischer-Tropsch catalysts with excellent catalytic performance. Similarly, mixtures containing a small weight fraction of a boehmite material with an average crystallite size of about 35 nm and a large weight fraction of a boehmite material with an average crystallite size of 15 or 25 nm form Fischer-Tropsch catalysts with excellent catalytic performance and hydrothermal stability.

Therefore, in addition of adding one or more structural stabilizers (like Si, Co, Mg, etc.) to the boehmite before and/or after shaping or forming (such as spray drying), combinations of boehmites may be used differing in average crystallite sizes to further optimize the pore size distribution of the resulting stabilized support obtained therefrom. In an embodiment, the boehmite material can include the mixture of two boehmites, one of which has a larger boehmite crystallite size (e.g., typically larger than 20 nm) for the purpose of forming a small fraction of larger pores (e.g., comprising between 1 to 20% of the total pore volume). Without being limited by theory, these larger pores may have a beneficial effect in the diffusion properties of each catalyst particle. The combination of two boehmites to form the support and catalyst precursor therefore may provide an additional factor for the optimization of the porous structure of the aluminum oxide-based matrix to provide a desired crystallite size distribution of the catalytic material (e.g., cobalt metal) deposited thereupon.

In one embodiment, a method for making a stabilized catalyst support with enhanced hydrothermal stability comprises forming a stabilized support from a mixture of at least two boehmite materials with different average crystallite sizes, differing by at least about 1 nm. In preferred embodiments, at least one boehmite has an average crystallite size in the range from about 4 to about 30 nm, and the difference between the average crystallite sizes is at least about 1 nm, preferably at least about 3 nm, more preferably more than about 5 nm. In more preferred embodiments, a first boehmite has an average crystallite size in the range from about 4 to about 30 nm, and a second boehmite has an average crystallite size in the range from about 20 to about 40 nm.

An embodiment includes a method for making a stabilized catalyst support with an enhanced hydrothermal stability, comprising a) contacting a boehmite material with at least one structural stabilizer or a compound thereof, wherein the boehmite material includes two or more crystalline boehmites, wherein at least one crystalline boehmite comprises an average crystallite size selected from a desired optimum range between about 4 nm and about 30 nm; and b) treating the boehmite material. In preferred embodiments, treating includes treating the boehmite material in the presence of the at least one structural stabilizer or compound thereof under suitable conditions to effect the conversion of the two or more crystalline boehmites to a stabilized aluminum oxide structure. In alternate embodiments, treating comprises calcining the boehmite material without the at least one structural stabilizer or compound thereof under suitable conditions to effect the conversion of the two or more crystalline boehmites to a stabilized aluminum oxide structure; then, contacting the calcined boehmite material with the at least one structural stabilizer or compound thereof, and calcining again.

Preferably, the at least one crystalline boehmite comprises an average crystallite size in a range of about 4 nm to about 30 nm, preferably from about 6 nm to about 30 nm, more preferably in a range of from about 8 nm to about 25 nm, and more preferably in a range from about 10 nm to about 25 nm, most preferably in a range of from about 10 nm to about 20 nm. In alternate embodiments, the at least one crystalline boehmite comprises an average crystallite size in a range of from about 15 nm to about 25 nm. In some embodiments, the boehmite material comprises a first crystalline boehmite having a first average crystallite size between about 4 nm and about 30 nm and a second crystalline boehmite having a second average crystallite size, wherein the second average crystallite size is at least about 1 nanometer larger than the second average crystallite size. The second average crystallite size may be between about 20 and about 40 nm; preferably between about 20 and about 35 nm; more preferably between about 25 and about 35 nm. In some embodiments, the first crystalline boehmite has a first average crystallite size from about 8 nm to about 30 nm, while the second crystalline boehmite has a second average crystallite size from about 20 nm to about 35 nm. Still in an alternate embodiment, the first crystalline boehmite has a first average crystallite size from about 10 nm to about 25 nm, while the second crystalline boehmite has a second average crystallite size from about 25 nm to about 35 nm.

In some embodiments, contacting includes 1a) mixing two or more crystalline boehmites in a solvent to form a boehmite mixture; 2a) shaping the boehmite mixture in the absence of the at least one structural stabilizer or compound thereof to generate a shaped boehmite material in the form of particles of a desired average particle size; and 3a) contacting the shaped boehmite material with the at least one structural stabilizer or a compound thereof to form a contacted shaped boehmite material. In an embodiment, shaping may generate particles of the shaped boehmite material particles comprising a particle size between about 20 microns and about 200 microns or particles comprising a particle size greater than about 500 microns, preferably between about 30 microns and about 150 microns. In an embodiment, such treating may be a low temperature treatment. In other embodiments, the contacted shaped boehmite material is calcined. In some embodiments, treating may be performed between shaping and contacting. In such embodiments, treating may include calcining the shaped boehmite material. In addition, contacting may proceed by impregnating a soluble decomposable compound of the at least one structural stabilizer onto the shaped aluminum oxide material.

In alternate embodiments, the contacting step (a) comprises: Ia) mixing the two or more crystalline boehmites and the at least one structural stabilizer or compound thereof in a solvent to form a boehmite mixture; IIa) shaping the contacted boehmite mixture in the presence of the at least one structural stabilizer or compound thereof to generate a shaped boehmite material in the form of particles of a desired average particle size; and IIIa) optionally, treating the shaped boehmite material. In alternative embodiments, treating includes a temperature of not more than about 350° C., so as to retain substantially the two or more crystalline boehmites.

In preferred embodiments, the boehmite material subjected to the heat treating step (b) is in the form of particles of desired average particles size greater than about 30 microns. The desired average particle size may be between about 30 microns and about 150 microns, preferably between about 50 microns and about 100 microns, more preferably between about 60 microns and about 90 microns.

Catalyst Composition

In an embodiment, the catalyst includes a catalytic metal deposited on the stabilized support. The catalytic metal is preferably a catalytic metal that enhances the yield or reaction rate of a hydrogenation reaction. In particular, the catalytic metal is preferably selected from among the Group 8 elements of the Periodic Table, such as iron (Fe), ruthenium (Ru), and osmium (Os); Group 9 elements, such as cobalt (Co), rhodium (Rh), and iridium (Ir); Group 10 elements, such as nickel (Ni), palladium (Pd), and platinum (Pt); and the metals molybdenum (Mo), rhenium (Re), and tungsten (W). The catalytic metal more preferably comprises cobalt, iron, ruthenium, nickel, or combinations thereof. The catalytic metal still more preferably comprises cobalt, iron, ruthenium, or combinations thereof. Most preferably, the catalytic metal comprises cobalt. The catalyst preferably contains a catalytically effective amount of the catalytic metal. The amount of catalytic metal present in the catalyst may vary widely.

Catalysts supported on the stabilized support derived from a mixture of boehmites have catalytic properties that are equal to or superior than those of a catalyst prepared from a stabilized support derived from a single boehmite material.

When the catalytic metal is cobalt, the catalyst preferably has a nominal composition that includes cobalt in an amount totaling from about 1% to about 50% by weight (as the metal) of total catalyst composition (catalytic metal, support, and any optional promoters), more preferably from about 5% to about 40% by weight, still more preferably from about 10 to about 37% by weight, and most preferably from about 15 to about 35% by weight. It will be understood that % indicates percent throughout the present specification.

When the catalytic metal is iron, the catalyst preferably has a nominal composition including from about 5 to about 75 wt % iron, preferably from about 10 to about 60 wt % iron, more preferably from about 20 to about 50 wt % iron.

When the catalytic metal is ruthenium, the catalyst preferably has a nominal composition including from about 0.01 to about 5 wt % ruthenium, preferably from about 0.5 to about 4 wt % ruthenium, more preferably from about 1 to about 3 wt % ruthenium.

It will be understood that, when the catalyst includes more than one supported metal, the catalytic metal, as termed herein, is the primary supported metal present in the catalyst. The primary supported metal is preferably determined by weight, wherein the primary supported metal is preferably present in the greatest % by weight.

The catalytic metal contained by a catalyst according to a preferred embodiment of the present invention is preferably in a reduced, metallic state before use of the catalyst in hydrogenation reactions. However, it will be understood that the catalytic metal can be present in the form of a metal compound, such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support.

Optionally, the present catalyst can also include at least one promoter known to those skilled in the art. The promoter may vary according to the catalytic metal. A promoter can be an element that also, in an active form, has catalytic activity in the absence of the catalytic metal. Such an element will be termed herein a promoter when it is present in the catalyst in a lesser wt % than the catalytic metal.

A promoter preferably enhances the performance of the catalyst. Suitable measures of the performance that may be enhanced include selectivity, activity, stability, lifetime, reducibility and resistance to potential poisoning by impurities such as sulfur, nitrogen, and oxygen. A promoter is preferably a hydrogenation reactions promoter, which is an element or compound that enhances the performance of a hydrogenation reactions catalyst in a hydrogenation reaction.

It will be understood that as contemplated herein an enhanced performance of a promoted catalyst can be calculated according to any suitable method known to one of ordinary skill in the art. In particular, an enhanced performance can be given as a percent and computed as the ratio of the performance difference to the performance of a reference catalyst. The performance difference is between the performance of the promoted catalyst and the reference catalyst, wherein the reference catalyst is a similar corresponding catalyst having the nominally same amounts, e.g. by weight percent, of all components except the promoter. It will further be understood that as contemplated herein a performance can be measured in any suitable units. For example, when the performance is productivity, productivity can be measured in grams product per hour per liter reactor volume, grams product per hour per kilogram catalyst, and the like.

Suitable promoters vary with the catalytic metal and can be selected from Groups 1-15 of the Periodic Table of the Elements. A promoter can be in elemental form. Alternatively, a promoter can be present in an oxide compound. Further, a promoter can be present in an alloy containing the catalytic metal. Except as otherwise specified herein, a promoter is preferably present in an amount to provide a weight ratio of elemental promoter:elemental catalytic metal of from about 0.00005:1 to about 0.5:1, preferably from about 0.0005:1 to about 0.25:1 (dry basis). When the promoter comprises a metal from Groups 7, 8, 9, and 10 of the Periodic Table such as rhenium, ruthenium, platinum, or palladium, the weight ratio of elemental promoter:elemental catalytic metal may be between about 0.00005:1 and about 0.05:1.

Further, when the catalytic metal is cobalt or iron, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as titanium (Ti), zirconium (Zr), and hafnium (Hf); Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rd) and iridium (Ir); Group 10 elements such as platinum (Pt) and palladium (Pd); Group 11 elements such as silver (Ag) and copper (Cu); Group 12 elements such as zinc (Zn), cadmium (Cd), and mercury (Hg); Group 13 elements such as gallium (Ga), indium (In), thallium (Tl), and boron (B); Group 14 elements such as tin (Sn) and lead (Pb); and Group 15 elements such as phosphorus (P), bismuth (Bi), and antimony (Sb).

When the catalytic metal is cobalt, iron, or combinations thereof, the promoter preferably comprises platinum, palladium, ruthenium, rhenium, silver, boron, copper, lithium, sodium, potassium, magnesium, manganese, or combinations thereof.

When the catalytic metal is cobalt, the promoter more preferably comprises rhenium, ruthenium, platinum, palladium, boron, silver, or combinations thereof. When the cobalt catalyst includes rhenium, the rhenium is preferably present in the catalyst in an amount between about 0.001 and about 5% by weight, more preferably between about 0.01 and about 2% by weight, most preferably between about 0.2 and about 1% by weight. When the cobalt catalyst includes ruthenium, the ruthenium is preferably present in the catalyst in an amount between about 0.0001 and about 5% by weight, more preferably between about 0.001 and about 1% by weight, most preferably between about 0.01 and about 1% by weight. When the cobalt catalyst includes platinum, the platinum is preferably present in the catalyst in an amount between about 0.00001 and about 5% by weight, more preferably between about 0.0001 and about 1% by weight, and most preferably between about 0.0005 and about 1% by weight. When the cobalt catalyst includes palladium, the palladium is preferably present in the catalyst in an amount between about 0.00001 and about 5% by weight, more preferably between about 0.0001 and about 2% by weight, most preferably between about 0.0005 and about 1% by weight. When the cobalt catalyst includes silver, the catalyst preferably has a nominal composition including from about 0.01 to about 10 wt % silver, more preferably from about 0.07 to about 7 wt % silver, still more preferably from about 0.1 to about 5 wt % silver. When the cobalt catalyst includes boron, the catalyst preferably has a nominal composition including from about 0.025 to about 2 wt % boron, more preferably from about 0.05 to about 1.8 wt % boron, still more preferably from about 0.075 to about 1.5 wt % boron.

By way of example and not limitation, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), manganese (Mn), calcium (Ca), strontium (Sr), and barium (Ba). When the catalytic metal is iron, the promoter more preferably comprises potassium, copper, lithium, sodium, silver, magnesium, or combinations thereof. When the catalytic metal is iron, the catalyst may include potassium or lithium as a promoter; and alternatively or in combination, the catalyst may include copper or silver. When the iron catalyst comprises lithium as a promoter, lithium is present in an amount preferably between about 0.05 wt % and about 5 wt % of lithium to total weight of catalyst; and more preferably, between about 0.5 wt % and about 2 wt %. When the iron catalyst comprises silver as a promoter, silver is present in an amount preferably between about 0.001 wt % and about 5 wt % of silver to total weight of catalyst; more preferably between about 0.001 wt % and about 2 wt % of silver to total weight of catalyst; and most preferably between about 0.005 wt % and 1 wt % of silver to total weight of catalyst. When the iron catalyst comprises potassium as a promoter, potassium is present in an amount preferably between about 0.0001 wt % and about 10 wt % of potassium to total weight of catalyst; more preferably, between about 0.0005 wt % and about 1 wt % of potassium to total weight of catalyst; and most preferably, between about 0.0005 wt % and about 0.5 wt % of potassium to total weight of support. When the iron catalyst comprises calcium as a promoter, calcium is present in an amount preferably between about 0.001 wt % and about 4 wt % of calcium to total weight of catalyst; more preferably, between about 0.5 wt % and about 3 wt % of calcium to total weight of catalyst. When the iron catalyst comprises copper as a promoter, copper is preferably present in an amount to provide a nominal catalyst composition including between about 0.1 wt % and about 10 wt % copper.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% by weight, more preferably between about 0.01 and about 0.5% by weight, still more preferably between about 0.05 and about 0.5% by weight.

The text immediately following discusses possible and preferred catalyst compositions in the context of sygas reactions. It is recognized that an analogous these compositions and conditions may vary for the water-forming hydrogenation reactions contemplated herein or for reactions involving any water-containing feed. One of ordinary skill in the art with the benefit of this disclosure will recognize the appropriate catalyst design as applied to each particular reaction of interest. The following discussion with respect to syngas reactions is for illustrative purposes in this regard.

In some embodiments of the present invention, the catalyst is suitable for use as a syngas catalyst (e.g., suitable in a process for producing syngas). In an embodiment, a syngas catalyst comprises rhodium, rhenium, ruthenium, palladium, platinum, iridium, nickel, or combinations thereof, as the active metal. Preferably the catalyst used for producing synthesis gas comprises rhodium, ruthenium, iridium, platinum, palladium, rhenium, or any combinations thereof. More preferably, the catalyst used for producing synthesis gas comprises rhodium, ruthenium, iridium, or any combinations thereof supported by the stabilized support. The syngas catalyst may comprise between about 0.1 wt % to about 20 wt % of active metal, preferably from about 0.5 wt % to about 10 wt % of active metal, and more preferably from about 0.5 wt % to about 6 wt % of active metal. Syngas catalyst compositions may also contain one or more promoters. In some embodiments when the active metal comprises rhodium, the promoter comprises an element selected from the group consisting of La, Ce, Pr, Nd, Pm, Sm, Eu, Gd, Tb, Dy, Ho, Er, Tm, Yb and Lu, preferably Sm, Eu, Pr and Yb. The introduction of a lanthanide and/or lanthanide oxide, e.g., $La_2O_3$ or $Sm_2O_3$, on the stabilized support surface before deposition of the active metal is believed to further enhance the metal-support interaction, and that the active metal also disperses better on the stabilized support surface on which a lanthanide and/or lanthanide oxide is deposited. In this embodiment, the promoter is preferably applied to the stabilized support before the active metal is applied or alternatively is applied simultaneously to the active metal.

As used herein, a nominal composition is preferably a composition specified with respect to an active catalyst. The active catalyst can be either fresh or regenerated. The nominal composition can be determined by experimental elemental analysis of an active catalyst. Alternatively, the nominal composition can be determined by numerical analysis from the known amounts of catalytic metal, promoter, and support used to make the catalyst. It will be understood that the nominal composition as determined by these two methods will typically agree within conventional accuracy.

Further, as used herein, it will be understood that each of the ranges, such as of ratio or weight %, herein is inclusive of its lower and upper values.

In some embodiments, a resulting Fischer-Tropsch reaction catalyst comprising a support stabilized with cobalt (or a cobalt-containing compound), or stabilized with magnesium (or a magnesium-containing compound) or stabilized with aluminum (or an aluminum-containing compound) comprises an average pore size between about 8 nm and about 22 nm; a BET surface area between about 40 $m^2$/g catalyst and about 100 $m^2$/g catalyst; and a pore volume between about 0.15 cc/g catalyst and about 0.3 cc/g catalyst, alternatively between about 0.16 cc/g catalyst and about 0.26 cc/g catalyst.

In some embodiments, a resulting Fischer-Tropsch reaction catalyst comprising a support stabilized with silicon or a silicon-containing compound comprises an average pore size between about 10 nm and about 15 nm; a BET surface area between about 70 $m^2$/g catalyst and about 100 $m^2$/g catalyst; and a pore volume between about 0.2 cc/g catalyst and about 0.3 cc/g catalyst.

The resulting Fischer-Tropsch reaction catalyst, which has a catalyst support comprising a stabilized aluminum oxide structure derived from a single boehmite material or a mixed-boehmite material, is highly active. The catalyst has an improved attrition resistance, and has a good hydrothermal stability, especially when using a single boehmite material or a mixed-boehmite material comprising at least one crystalline boehmite with the most preferred average crystallite size ranging from about 10 nm to about 20 nm.

In further embodiments, as shown later in Table 5, the % conversion of the CO reactant as well as the selectivity and productivity of the valuable C5+ hydrocarbon products are considerably higher when the Fischer-Tropsch catalyst is formed from a boehmite having an average crystallite size of from about 10 nm to about 20 nm as opposed to when it is formed from a boehmite having an average crystallite size of less than 10 nm or greater than about 20 nm.

Catalyst Preparation

The catalysts may be prepared by any suitable method. Without limitation, examples of suitable methods include impregnating a catalyst material onto the stabilized support of the present invention, extruding the stabilized support together with the catalyst material to prepare catalyst extrudates, spray-drying the catalyst material and the support from a solution containing both, and/or precipitating the catalyst material onto a support. The supported catalysts may be used in the form of powders, particles, pellets, monoliths, honeycombs, packed beds, foams, and aerogels. The catalyst material can include any one or any combination of a catalytic metal, a precursor compound of a catalytic metal, a promoter, and a precursor compound of a promoter.

The most preferred method of preparation may vary among those skilled in the art depending, for example, on the desired catalyst particle size. Those skilled in the art are able to select the most suitable method for a given set of requirements.

One method of preparing a catalyst includes making a catalyst precursor by applying a catalyst material (such as catalytic metal and/or promoter element) onto the stabilized support of the present invention. The applying step may include impregnating the stabilized catalyst support with a solution containing the catalyst material. Suitable solvents include water and organic solvents (e.g., toluene, methanol, ethanol, and the like). Those skilled in the art will be able to select the most suitable solvent for a given catalyst material. The catalyst material can be in the form of a salt of a catalytic metal or promoter element. Thus, one method of preparing the catalyst includes incipient wetness impregnation of the stabilized catalyst support with a solution of a soluble catalytic metal salt and optionally a soluble promoter metal compound. Incipient wetness impregnation preferably proceeds by solution of one or more compounds of the catalyst material (such as a cobalt compound) in a minimal amount of solvent sufficient to fill the pores of the support. Alternatively, the catalyst material can be applied to the stabilized support in the form of a zero valent compound of a catalytic metal or promoter element. Thus, another method comprises impregnating the support with a solution of zero valent metal such as cobalt carbonyl (e.g., $Co_2(CO)_8$, $Co_4(CO)_{12}$) or the like. Multiple steps of impregnation can be done to achieve the desired amount of catalyst material loading.

Another method of preparing the supported catalyst includes making a catalyst precursor by impregnating the stabilized catalyst support with a molten salt of a catalytic metal and/or promoter. Thus, another method includes preparing the supported catalyst from a molten metal salt. One such method includes impregnating the support with a molten metal nitrate (e.g., $Co(NO_3)_2 \cdot 6H_2O$). A promoter compound can be impregnated separately from any cobalt, in a separate step. Alternatively, a promoter compound can be impregnated simultaneously with, e.g. in the same solution as, at least a portion of the catalytic metal.

When a catalyst material is impregnated as a precursor compound of the catalyst material, e.g. a salt or a zero valent compound, those skilled in the art will be able to select suitable catalyst material precursor compound(s).

By way of example and not limitation, suitable cobalt-containing precursor compounds include, for example, hydrated cobalt nitrate (e.g. cobalt nitrate hexahydrate), cobalt carbonyl, cobalt acetate, cobalt acetylacetonate, cobalt oxalate, and the like. Hydrated cobalt nitrate, cobalt carbonyl and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent.

Suitable rhenium-containing precursor compounds soluble in water are preferred and include, for example, perrhenic acid, ammonium perrhenate, rhenium pentacarbonyl chloride, rhenium carbonyl, and the like. Suitable ruthenium-containing precursor compounds soluble in water include for example ruthenium carbonyl, $Ru(NH3)_6.Cl_3$, Ru(III)2,4-pentanedionoate, ruthenium nitrosyl nitrate, and the like. Water-soluble ruthenium-containing precursor compounds are preferred. Suitable platinum-containing precursor compounds soluble in water include, for example, $Pt(NH_3)_4(NO_3)_2$ and the like. Alternatively, the platinum-containing precursor can be soluble in an organic solvent, such as platinum acetyl acetonate soluble in acetone. Suitable boron-containing precursor compounds soluble in water include, for example, boric acid and the like. Alternatively, the boron-containing precursor can be soluble in an organic solvent. Suitable silver-containing precursor compounds soluble in water include, for example, silver nitrate ($AgNO_3$) and the like. Alternatively, the silver-containing precursor can be soluble in an organic solvent. Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

The catalyst precursor (e.g., support impregnated with a catalytic metal or a compound thereof and optionally a promoter or a compound thereof) is preferably treated to form the catalyst. The treatment can include drying the catalyst precursor (e.g., drying the impregnated support). Drying preferably occurs at a temperature between about 80° C. and about 150° C. Typically, drying proceeds for from about 0.5 to about 24 hours at a pressure of from about 1 to about 75 atm, more preferably from about 1 to about 10 atm, most preferably at about 1 atm.

Alternatively or in combination to drying, treating the catalyst precursor preferably includes calcining (e.g., calcining the impregnated support). The calcination preferably achieves conversion of any impregnated decomposable compound or salt of a catalyst material to an oxide form of the catalyst material on the stabilized support, for example conversion of the impregnated salt of a catalytic metal to an oxide form. For example and by no limitation, when the catalytic metal includes cobalt and the catalyst precursor includes the stabilized support impregnated with a decomposable salt of cobalt, the calcination preferably proceeds at a temperature of at least about 200° C. Further, the calcination of the catalyst precursor preferably proceeds at a temperature less than the temperature at which loss of support surface area is appreciable. It is believed that, at temperatures above 900° C., loss of support surface area is appreciable. When the catalytic metal includes cobalt, the calcination temperature preferably ranges from about 200° C. to about 900° C. In some embodiments, the calcination of a catalyst precursor which includes cobalt is performed at a calcination temperature from about 350° C. to about 800° C., still more preferably from about 450° C. to about 800° C., and most preferably from about 450° C. to about 755° C. In alternate embodiments, the calcination of a catalyst precursor that includes cobalt is performed at a calcination temperature from about 200° C. to about 450° C., preferably from about 210° C. to about 425° C., more preferably from about 215° C. to about 400° C., still more preferably more preferably from about 215° C. to about 400° C., and most preferably from about 220° C. to about 325° C. Typically, calcining proceeds from about 0.5 to about 24 hours at a pressure of about 0.01 to about 75 atm, more preferably from about 1 to about 10 atm, most preferably at about 1 atm. When the preparation of the catalyst includes a multi-step impregnation of a catalytic metal on the stabilized support, calcination may be performed after each impregnation of the catalytic metal-containing compound and optionally of the promoter-containing compound, or it may be performed after all impregnations have been completed. However, any calcining step of the catalyst precursor after any impregnation following the first calcination preferably proceeds at a temperature of not more than about 500° C., preferably not more than about 450° C., more preferably not more than about 350° C. Alternatively, when the catalyst is used for the production of synthesis gas from one or more hydrocarbon gases, the catalytic metal in the syngas catalyst is selected from the group consisting of rhenium, rhodium, iridium, platinum, palladium, ruthenium, nickel, and combinations thereof; and calcining the catalyst precursor is typically done at a temperature between about 300° C. and about 1200° C., preferably between about 500° C. and about 1100° C.

Calcining at a pressure of about 100 kPa or higher is desirable. The calcining can be performed at pressures from about 0 to about 500 kPa (about 0 to about 5 atm), more preferably from about 100 to about 500 kPa (about 1 atm to about 5 atm), most preferably from about 100 to about 105 kPa (about 1 atm).

The impregnation of catalytic metal and any optional promoter on the support can proceed by multi-step impregnation, such as by two, three, or four impregnation steps. Each impregnation step can include impregnation of any one or combination of a catalytic metal and promoter. Each impregnation step can be followed by any of the above-described treatments of the impregnated support. In particular, each step of impregnating the support to form an impregnated support can be followed by treating the impregnated support to form a treated impregnated support. Thus, a multi-step impregnation can include multiple steps of drying and/or calcination. Each subsequent step of drying can proceed at a different temperature from any earlier steps of drying. Further, each subsequent step of calcination can proceed at a different temperature than the temperature used in any earlier steps of calcination. By way of example and not limitation, a multi-step impregnation can include calcining the support at a first temperature that is higher than the temperature for subsequent calcinations.

The impregnation, drying, and calcination steps may be repeated, for example, until the desired catalytic metal loading is obtained. Each impregnation step may include impregnation of any one or combination of catalytic metal-containing compound and promoter-containing compound. Each subsequent step of drying may proceed at a different temperature from any earlier steps of drying. Further, each subsequent step of calcination may proceed at a different temperature from any earlier steps of calcination.

The resulting catalyst or catalyst precursor, which includes a catalytic metal oxide on the stabilized support (comprising an aluminum oxide structure obtained from a boehmite material), may be ready to use in a catalytic process if the catalyst precursor does not require an activation step or if the catalyst precursor will be activated during said catalytic process (e.g., an in situ reduction step in a reactor vessel in which it is to be used).

The resulting catalyst or catalyst precursor, which includes a metal oxide on a support comprising a stabilized aluminum oxide structure obtained from boehmite, is desirably converted to an active catalyst before using the catalyst, for example to facilitate the Fischer-Tropsch reaction. The catalyst precursor can be activated via a reduction treatment in the presence of a reducing gas at an elevated temperature.

In an embodiment, at least a portion of the metal(s) of the catalytic metal component of the catalysts may be present in a reduced state (i.e., in the metallic state). Therefore, it may be advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 75° C. to about 500° C., for about 0.5 to about 50 hours at a pressure of about 1 to about 75 atm, preferably at a pressure of about 1 to about 10 atm. Pure hydrogen can be used in the reduction treatment. Moreover, a mixture of hydrogen and an inert gas such as nitrogen or a mixture of hydrogen and other suitable gases, such as carbon monoxide and carbon dioxide, can be used in the reduction treatment. Reduction with pure hydrogen and reduction with a mixture of hydrogen and carbon monoxide are preferred. The amount of hydrogen may range from about 1% to about 100% by volume.

The metal catalyst described above may be used to facilitate any reaction requiring a reduced metal catalyst. That is, the catalyst may be used with various reactants to promote the production of different products. In some embodiments, the catalyst described above is used in a Fischer-Tropsch process for producing synthesis gas or for synthesizing hydrocarbons and/or alcohols.

Water-Forming Hydrogenation Reactions

According to the present invention a hydrogenation reactor can comprise any of the reactor technologies and/or methods known in the art. Reactions suitable for enhancement by the improved catalysts supports disclosed herein include, but are not limited to, alcohol synthesis reactions, dehydration reactions, hydrodeoxygenation reactions, methanation reactions, catalytic combustion reaction, hydrocondensation reactions, and sulfur dioxide hydrogenation reactions. It is also recognized that this process may be also extended to any reaction where the feed contains water.

Regardless of the source, the hydrocarbon-containing feed and the oxygen-containing feed are reacted under catalytic conditions. Improved catalyst compositions in accordance with the present invention are described herein. They generally are comprised of a catalytic metal, some alloyed, which has been reduced to its active form and with one or more optional promoters on a stabilized catalyst support. Due to the high temperature (i.e., 800° C. or higher) that may be employed in the synthesis gas production process, the stabilized catalyst support that has been subjected to a calcination temperature of about 900° C. or higher during its preparation may be suitable for high-temperature reactions such as catalytic partial oxidation. Preferred calcination temperatures for the stabilized catalyst support of a syngas production catalyst include ranges from about 900° C. to about 1600° C.; alternatively from about 1000° C. to about 1500° C.; and alternatively from about 1100° C. to about 1400° C.

The syngas catalyst compositions according to the present invention comprise an active metal selected from the group consisting of Group VIII metals, rhenium, tungsten, zirconium, their corresponding oxides or ions, and any combinations thereof, preferably a group VII metal or rhenium, more preferably rhodium, indium, ruthenium, rhenium, or combinations thereof. In some embodiments when the active metal is rhodium, rhodium is comprised in a high melting point alloy with another metal. It has been discovered that in addition to the enhanced thermal stability of the support, the high melting point rhodium alloys used in some of these syngas catalysts confer additional thermally stability than non-alloy rhodium catalysts, which may lead to enhanced ability of the catalyst to resist various deactivation phenomena.

Without being limited by theory, in some instances, during syngas reactions, several undesired processes, such as coking (carbon deposition), metal migration, and sintering of metal and/or the support, can occur and severely deteriorate catalytic performance. The catalyst compositions of the present invention are better able to resist at least one of these phenomena over longer periods of time than conventional catalysts. As a consequence, these novel rhodium containing catalysts on the stabilized support derived from a boehmite material comprising a crystalline boehmite with a desired optimum crystallite size can maintain high methane conversion as well as high CO and $H_2$ selectivity over extended periods of time with little to no deactivation of the syngas catalyst.

The support structure of these catalysts can be in the form of a monolith or can be in the form of divided or discrete structures or particulates. Particulates are preferred. Small support particles tend to be more useful in fluidized beds. Preferably at least a majority (i.e., >50%) of the particles or distinct structures have a maximum characteristic length (i.e., longest dimension) of less than 6 millimeters (mm), preferably less than 3 mm, more preferably between 0.8 mm and 3 mm. According to some embodiments, the divided catalyst structures have a diameter or longest characteristic dimension of about 0.5 mm to about 10 mm, preferably between about 0.5 mm and about 6 mm. In other embodiments, they are in the range of about 50 microns to about 6 mm.

The hydrocarbon feedstock and the oxygen-containing gas may be passed over the catalyst at any of a variety of space velocities. Space velocities for the process, stated as gas hourly space velocity (GHSV), are in the range of about 20,000 to about 100,000,000 hr-1, more preferably of about 100,000 to about 800,000 hr-1, most preferably of about 400,000 to about 700,000 hr-1. Although for ease in comparison with conventional systems space velocities at standard conditions have been used to describe the present invention, it is to be understood that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of hr-1. Under these operating conditions, a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time less than 10 milliseconds is highly preferred. The duration or degree of contact is preferably regulated so as to produce a favorable balance between competing reactions and to produce sufficient heat to maintain the catalyst at the desired temperature.

The process is operated at atmospheric or super-atmospheric pressures. The pressures may be in the range of about 100 kPa to about 100,000 kPa (about 1-100 atm), preferably from about 200 kPa to about 5,000 kPa (about 2-50 atm). The process is preferably operated at a temperature in the range of about 350° C. to about 2,000° C. More preferably, the temperature is maintained in the range of about 400° C.-2,000° C., or even more preferably in the range of about 600° C.-1,500° C., as measured at the reactor outlet.

The catalysts of the present invention may maintain hydrocarbon conversion of equal to or greater than about 85%, preferably equal to or greater than about 90% after 100 hours of operation when operating at pressures of greater than 2 atmospheres. Likewise, the catalysts of the present invention may maintain CO and $H_2$ selectivity of equal to or greater than about 85%, preferably equal to or greater than about 90% after 100 hours of operation when operating at pressures of greater than 2 atmospheres.

The synthesis gas product contains primarily hydrogen and carbon monoxide, however, many other minor components may be present including steam, nitrogen, carbon dioxide, ammonia, hydrogen cyanide, and the like, as well as unreacted feedstock, such as methane and/or oxygen. The synthesis gas product, i.e., syngas, is then ready to be used, treated, or directed to its intended purpose. The product gas mixture emerging from the syngas reactor may be routed directly into any of a variety of applications, preferably at pressure. For example, in the instant case some or all of the syngas can be used as a feedstock in subsequent synthesis processes, such as Fischer-Tropsch synthesis, alcohol (particularly methanol) synthesis, hydrogen production, hydroformylation, or any other use for syngas. One such preferred application for the CO and $H_2$ product stream is for producing, via the Fischer-Tropsch synthesis, higher molecular weight hydrocarbons, such as hydrocarbons with 5 or more carbon atoms (C5+ hydrocarbons).

Syngas may be at a temperature of about 600-1500° C. when leaving a syngas reactor. The syngas may be transitioned to be useable in a Fischer-Tropsch or other synthesis reactors, which operate at lower temperatures from about 200° C. to about 400° C. The syngas may be cooled, dehydrated (i.e., taken below 100° C. to knock out water) and compressed during the transition phase. Thus, in the transition of syngas from the syngas reactor to for example a Fischer-Tropsch reactor, the syngas stream may experience a temperature window of 50° C. to 1500° C.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A hydrogenation reaction process comprising the steps of:
providing a hydrothermally stable alumina support, the hydrothermally stable alumina support produced by the process comprising:
(a) forming a mixture of a crystalline hydrous alumina precursor and a first structural stabilizer, wherein the crystalline hydrous alumina precursor comprises two or more crystalline boehmites having different average crystallite sizes differing by at least about 1 nm;
(b) drying the mixture to form a dried material, wherein the step of drying comprises spray-drying;
(c) impregnating the dried material with a second structural stabilizer to form a support precursor; and
(d) heat treating said support precursor to form a stabilized support, wherein the step of heat treating comprises calcining at a temperature between about 450° C. and about 900° C. to convert the two or more crystalline boehmites to a hydrothermally stable alumina support;
reacting a plurality of reactants under conversion promoting conditions in the presence of a catalyst supported by the hydrothermally stable alumina support to produce a plurality of products through a water-forming hydrogenation reaction;
wherein the step of reacting comprises allowing the water-forming hydrogenation reaction to occur wherein the water-forming hydrogenation reaction is selected the group consisting of:
an alcohol synthesis reaction;
a dehydration reaction;
a hydrodeoxygenation reaction;
a catalytic combustion reaction;
a hydrocondensation reaction; and
a sulfur dioxide hydrogenation reaction; and
allowing a plurality of products to be formed according to the water-forming hydrogenation reaction.

2. The method of claim 1 further comprising the step of low-temperature treating the dried mixture from step (b) to form a partially-stabilized support, wherein said low-temperature treating comprises exposing said dried mixture to a temperature of about 350° C. or less to substantially retain said two or more crystalline boehmites.

3. The method of claim 1 wherein the water-forming hydrogenation reaction is the alcohol synthesis reaction.

4. The method of claim 1 wherein the water-forming hydrogenation reaction is the dehydration reaction.

5. The method of claim 1 wherein the water-forming hydrogenation reaction is the hydrodeoxygenation reaction.

6. The method of claim 1 wherein the water-forming hydrogenation reaction is the catalytic combustion reaction.

7. The method of claim 1 wherein the water-forming hydrogenation reaction is the hydrocondensation reaction.

8. The method of claim 1 wherein the water-forming hydrogenation reaction is the sulfur dioxide hydrogenation reaction.

9. The method of claim 1 wherein the first structural stabilizer is the same composition as the second structural stabilizer.

10. A reaction process comprising the steps of:
providing a hydrothermally stable alumina support, the hydrothermally stable alumina support produced by the process comprising:
(a) forming a mixture of a crystalline hydrous alumina precursor and a first structural stabilizer, wherein the crystalline hydrous alumina precursor comprises two or more crystalline boehmites having different average crystallite sizes differing by at least about 1 nm;
(b) drying the mixture to form a dried material, wherein the step of drying comprises spray-drying;
(c) impregnating the dried material with a second structural stabilizer to form a support precursor; and
(d) heat treating said support precursor to form a stabilized support, wherein the step of heat treating comprises calcining at a temperature between about 450° C. and about 900° C. to convert the two or more crystalline boehmites to a hydrothermally stable alumina support;

reacting a plurality of reactants under conversion promoting conditions in the presence of a catalyst supported by the hydrothermally stable alumina support to produce a plurality of products in a reactor;

wherein the step of reacting comprises introducing water as feed to the reactor; and allowing a plurality of products to be formed according to the reaction.

* * * * *